May 2, 1933.  J. M. GLADISH  1,907,292
LOOP AND PILE FORMING MACHINE
Filed July 7, 1928  10 Sheets-Sheet 1

Inventor
John M. Gladish
Paul F. Eaton
Attorney

May 2, 1933.  J. M. GLADISH  1,907,292
LOOP AND PILE FORMING MACHINE
Filed July 7, 1928  10 Sheets-Sheet 2

Inventor
John M. Gladish
Attorney

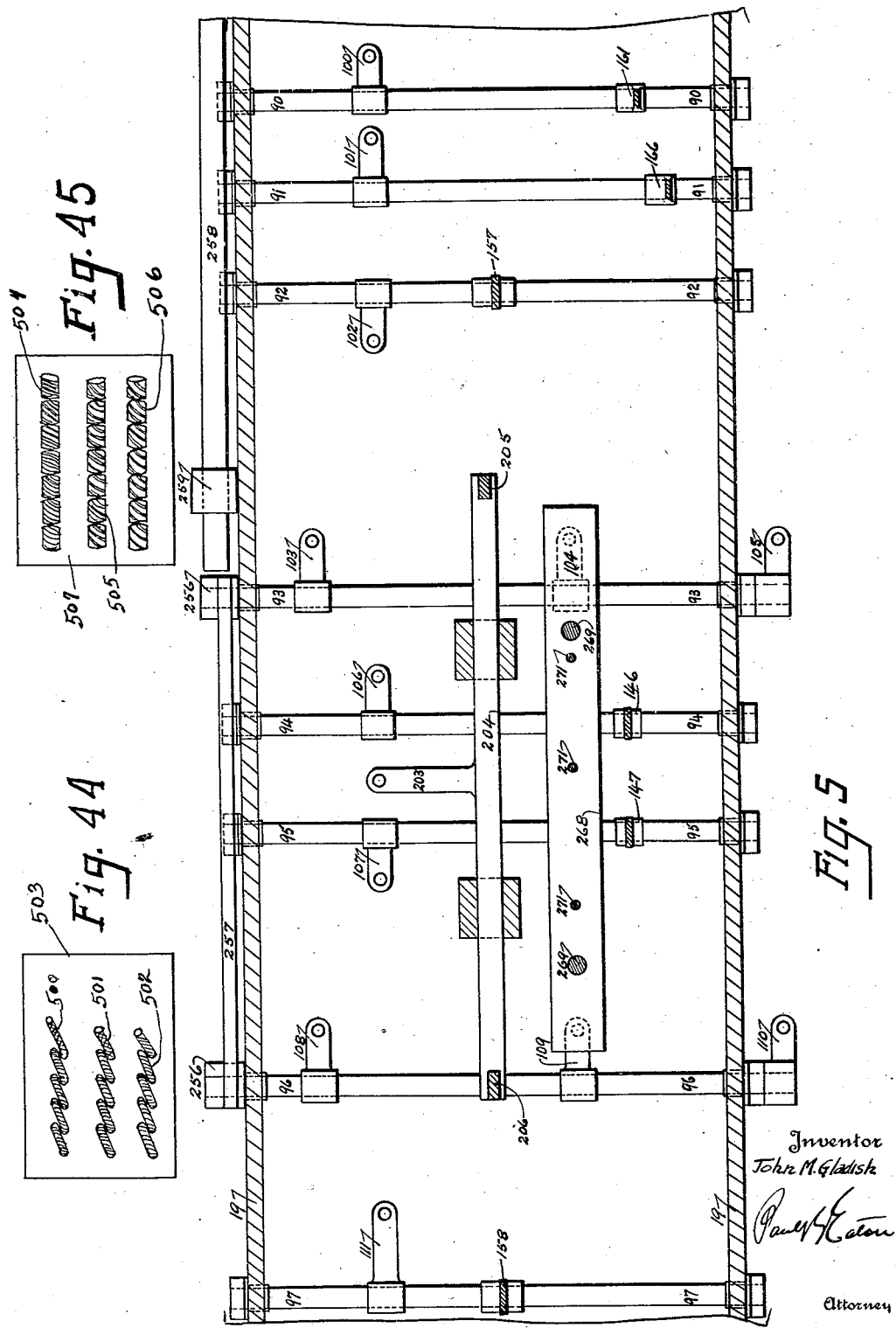

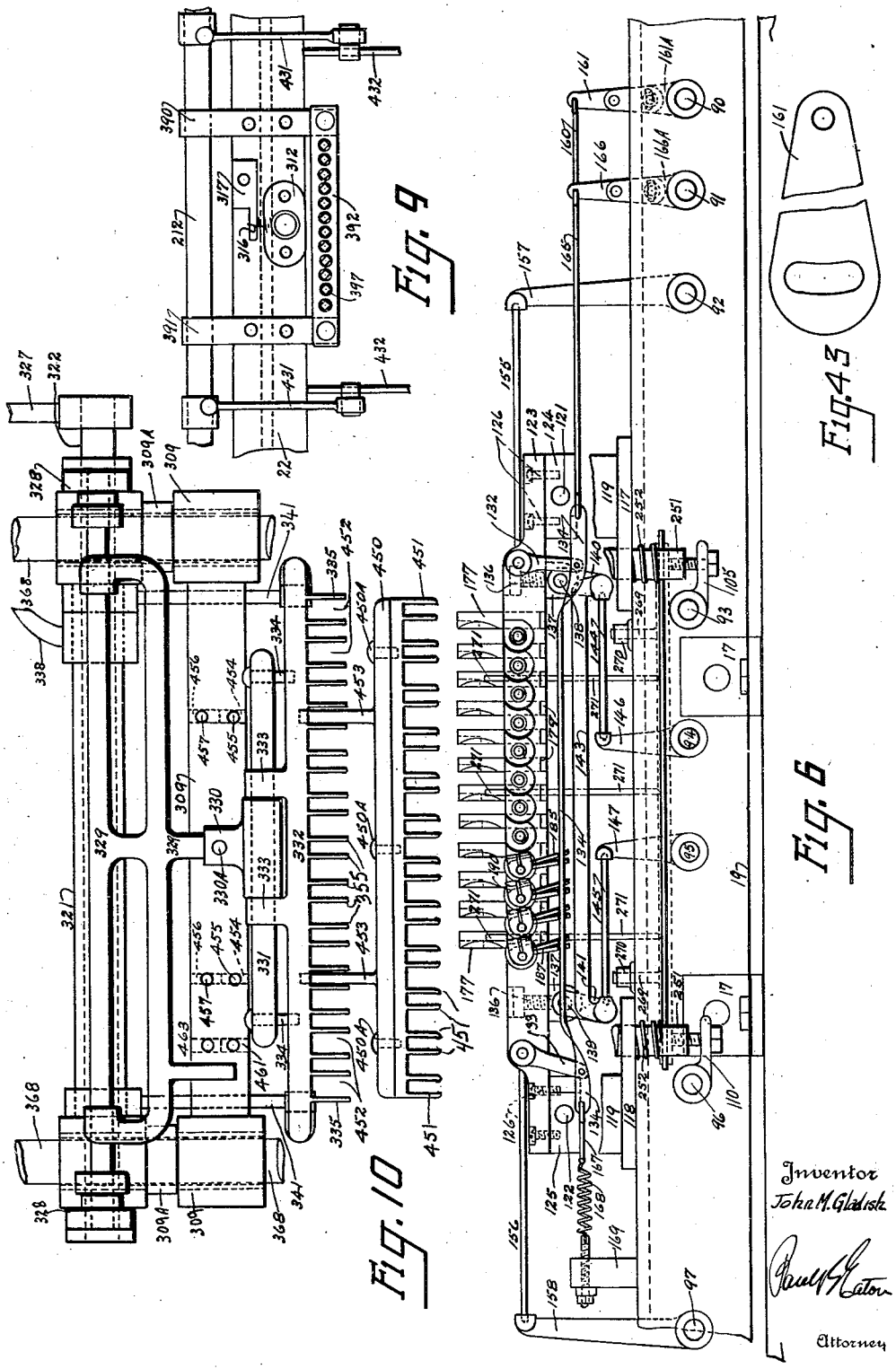

May 2, 1933. J. M. GLADISH 1,907,292
LOOP AND PILE FORMING MACHINE
Filed July 7, 1928 10 Sheets-Sheet 7
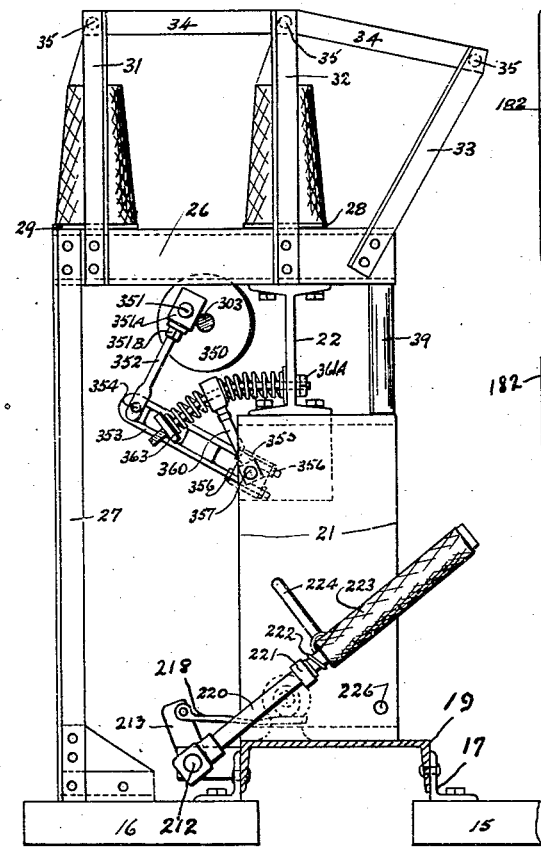
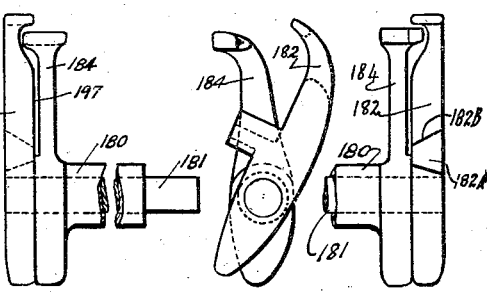
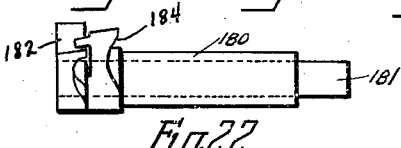
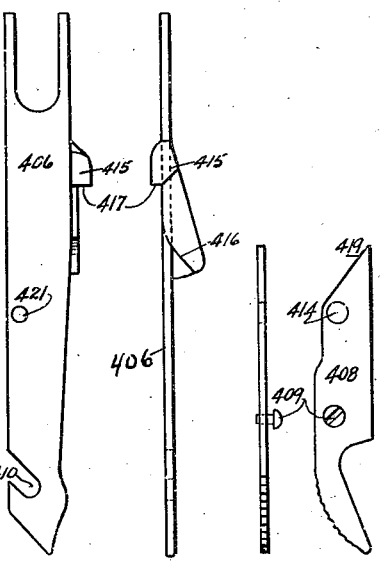
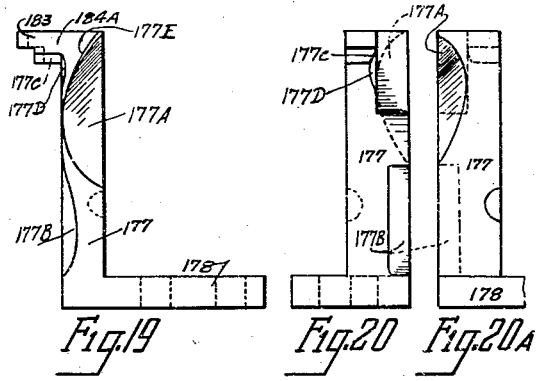
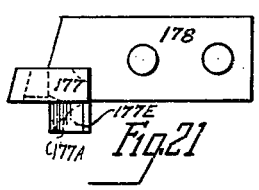
Inventor
John M. Gladish
By Paul S. Eaton
Attorney May 2, 1933. J. M. GLADISH 1,907,292
LOOP AND PILE FORMING MACHINE
Filed July 7, 1928 10 Sheets-Sheet 8
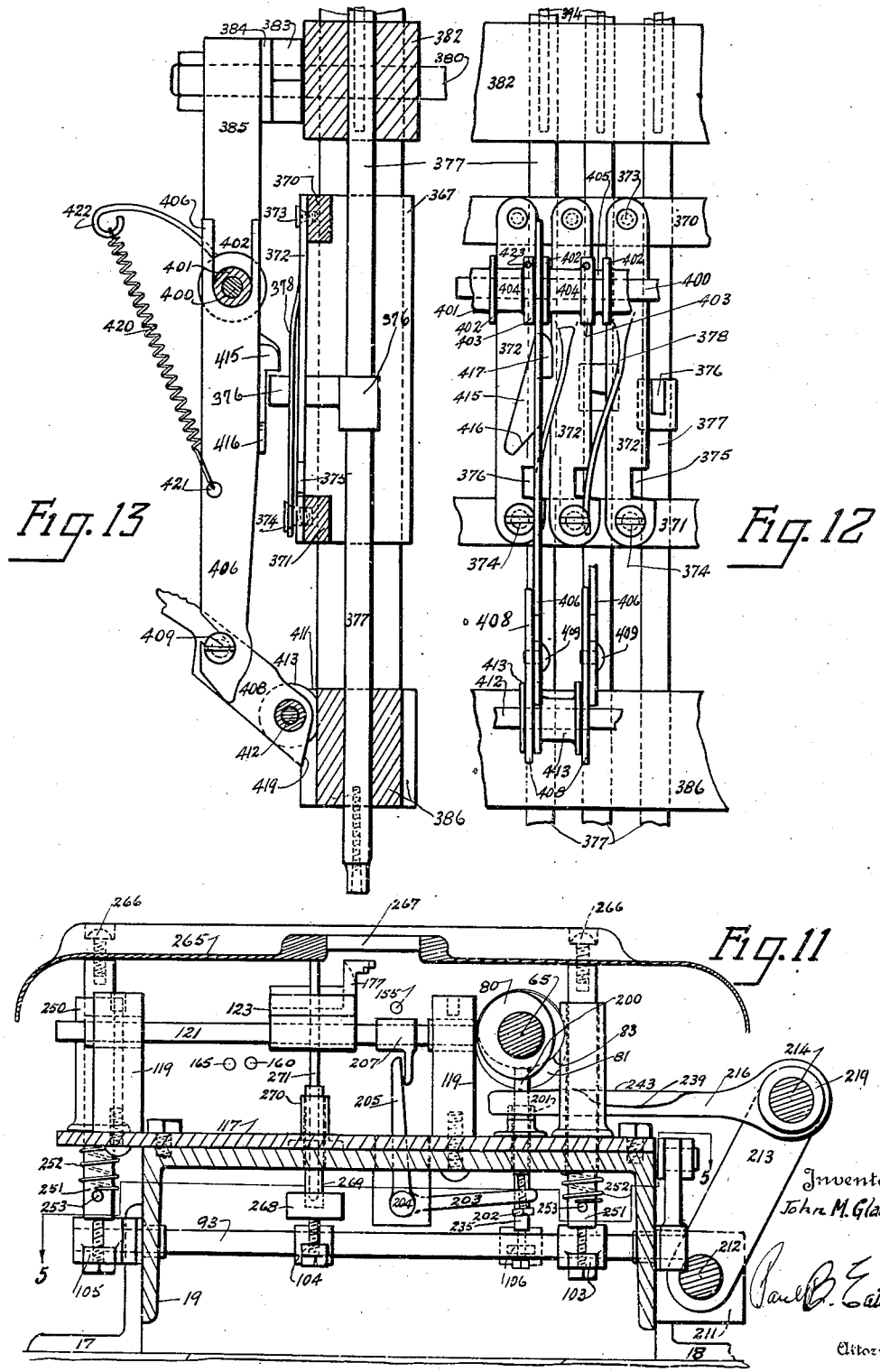

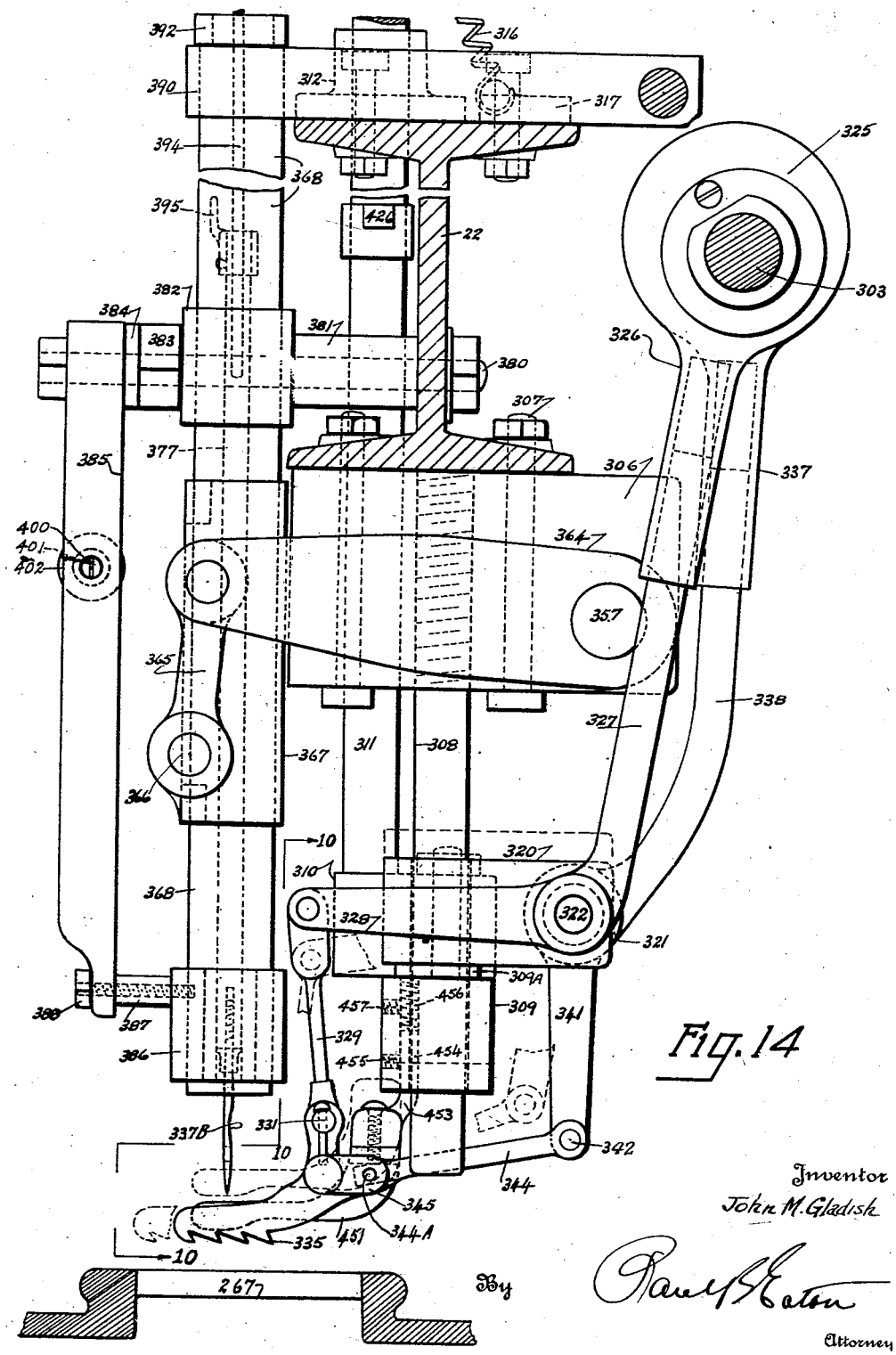

May 2, 1933.  J. M. GLADISH  1,907,292
LOOP AND PILE FORMING MACHINE
Filed July 7, 1928   10 Sheets-Sheet 10

Inventor
John M. Gladish
By Paul H. Eaton
Attorney

Patented May 2, 1933

1,907,292

UNITED STATES PATENT OFFICE

JOHN M. GLADISH, OF CHATTANOOGA, TENNESSEE, ASSIGNOR TO VALWAY RUG MILLS, INCORPORATED, OF LA GRANGE, GEORGIA, A CORPORATION OF GEORGIA

LOOP AND PILE FORMING MACHINE

Application filed July 7, 1928. Serial No. 290,977.

My invention relates to a machine having a plurality of needles for making a plurality of parallel rows of stitches in a fabric and so designed as to make loops on the bottom of the fabric or at the will of the operator to cut the said loops to form tufts, and having means for adjustment of the mechanism of the machine to form loops both on the upper and lower surfaces of the fabric and if desired to form loops on the upper side of the fabric and to cut the loops on the lower side of the fabric to form tufts, the lower side of the fabric being considered throughout this specification as being normally the finished surface of the fabric, after it has passed through the machine.

An object of my invention is to provide a machine for making a plurality of rows of parallel stitches in a fabric together with means for forming loops in conjunction with the stitches on the lower portion of the fabric or on both the lower and upper surface of the fabric, for optionally cutting the loops on the lower side of the fabric, for regulating the length of the loops on both sides of the fabric, together with means for rendering operative or inoperative any number of the needles.

Another object of my invention is to provide a machine for making pile and tuft fabrics, which comprises a needle head carrying a plurality of vertically reciprocating needle bars together with feeder foot and presser foot means embodied in the needle head, with means co-operating with the needle head and the reciprocating needles to render operative or inoperative any number of the needles while the machine is in operation, together with means for forming loops on both the upper and lower sides of the fabric and means associated with the loop-forming means for optionally cutting the loops on the lower side of the fabric with means for regulating the lengths of the loops or tufts both on the lower and upper portions of the fabric.

Another object of my invention is to provide a machine for forming loops on one or both sides of a fabric, which machine is capable of forming a single row of loops or a plurality of rows of loops, together with means for regulating the distance the loops project from the fabric on one or both sides thereof, with means for severing the loops or leaving the same unsevered, as desired.

Another object of my invention is to provide a machine which will automatically form at the same time a plurality of rows of loops in a sheeting or fabric, together with means for either severing the loops to form piles or to permit the loops to remain unsevered, with means for regulating the lengths of the loops and piles on the lower side of the fabric as it passes through the machine or at the will of the operator to form loops on both the upper and lower portions of the fabric and for optionally severing the loops on the lower side of the fabric, together with means for gripping both portions of the thread during the loop-forming operation and for holding the thread in a stationary position during the loop-forming operation.

I have shown a preferred embodiment of my invention in the accompanying drawings, in which Figure 1 is a front elevation of my machine with parts of the lower portion thereof broken away;

Figure 5 is a cross-sectional plan view taken along the line 5—5 in Figure 11;

Figure 6 is an enlarged front elevation of the lower central portion of my machine with the cover plates omitted;

Figure 7 is an end elevation of the left hand end of my machine;

Figure 8 is a vertical, cross-sectional view taken along the line 8—8 in Figure 1 with the thread guide supports omitted;

Figure 9 is an enlarged, detailed plan view of the upper central portion of my machine as shown in Figure 1;

Figure 10 is an enlarged front elevation of a portion of my machine taken along the line 10—10 in Figure 14;

Figure 11 is an enlarged cross-sectional view taken along the line 11—11 in Figure 4;

Figure 12 is an enlarged, detailed front elevation of the means controlling the operation of the needle bars;

Figure 13 is a side elevation of Figure 12, taken from the right hand side of Figure 12;

Figure 14 is an enlarged, cross-sectional elevation of the presser foot, feeding mechanism and needle bar operating mechanism taken along the line 14—14 in Figure 1;

Figure 15 is an enlarged, detailed side elevation of a portion of the tripping means for controlling the needle bars;

Figure 16 is an elevation taken from the right hand side of Figure 15;

Figure 17 is a side elevation of the lever means associated with the lower end of the structure shown in Figure 15, complete assembly being shown in Figure 13;

Figure 18 is an edge view of the structure shown in Figure 17 looking from the left;

Figure 19 is an enlarged side elevation of the means co-operating with the grippers for holding the thread, for forming loops and piles as shown in Figures 26 and 32 inclusive;

Figure 20 is a rear elevation of the structure shown in Figure 19 looking from the left hand side of Figure 19;

Figure 26:
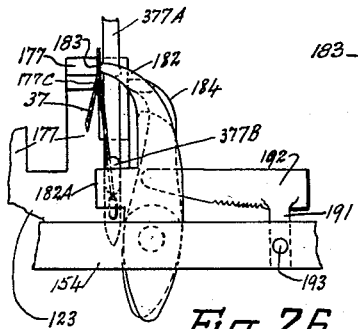
Figure 27:
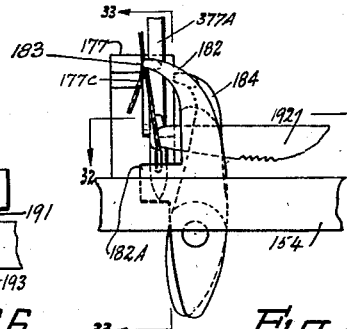
Figure 28:
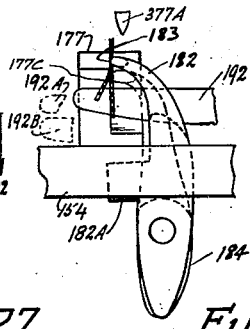
Figure 32:
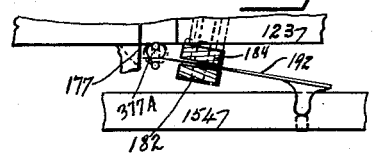
Figure 29:
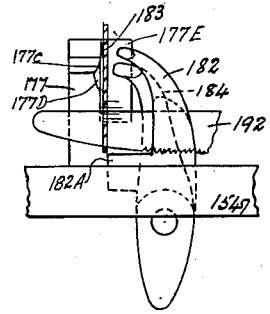
Figure 30:
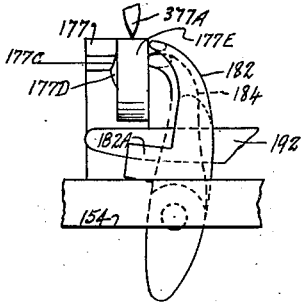
Figure 31:
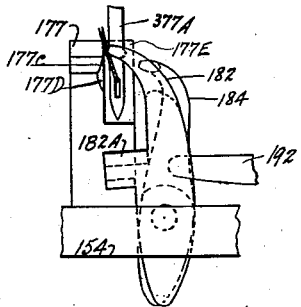
Figure 33:
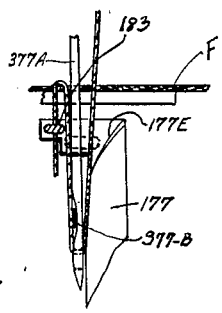
Figures 34, 35, 36:
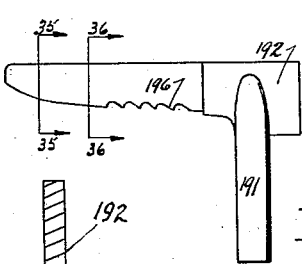
Figure 37:
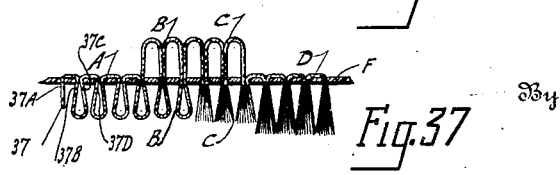

Figure 20—A is a reverse view of Figure 20;

Figure 21 is a plan view of Figure 19;

Figure 22 is an enlarged plan view of the combined grippers and looper knife guides for holding the thread while piles, loops and tufts are being formed;

Figure 23 is a side elevation of the structure shown in Figure 22 taken from the lower side thereof;

Figure 24 is an end elevation of Figure 23 taken from the left hand side thereof, showing the grippers and guides in different positions;

Figure 25 is a reverse view of Figure 23;

Figure 26 is an enlarged detailed, rear elevation showing a set of the combined grippers and guides, needle, abutment for grippers, looping knife, and showing the needle in its lowermost position;

Figure 27 is a view similar to Figure 26 showing the needle on its upward travel with the looper and knife entering the loop and one of the grippers in gripping position;

Figure 28 is a view similar to the two preceding views, showing the needle as it has emerged from the mechanism with the combined looper and cutting knife, and both grippers in gripping position, showing the operative position of the mechanism for forming loops only;

Figure 29 is a view similar to the three preceding views after the looping knife has completed its travel and function of cutting the loop and showing the grippers released, and the looping knife receding;

Figure 30 is a view similar to the four preceding views, showing the position of parts as the needle enters the loop forming mechanism with the looping knife moving to the right hand to a point where it will reverse its travel for forming another loop;

Figure 31 is a view similar to the five preceding views, showing a further downward movement of the needle and the change in position of associated parts;

Figure 32 is a cross-sectional view taken along the line 32—32 in Figure 27;

Figure 33 is a cross-sectional view taken along the line 33—33 in Figure 27;

Figure 34 is an enlarged rear elevation of the combined looping and pile forming knife;

Figure 35 is a cross-sectional view taken along the line 35—35 in Figure 34 showing a section of the loop forming portion of the knife;

Figure 36 is a cross-sectional view taken along the line 36—36 in Figure 34 showing the portion for cutting loops to form piles when the looper is given its maximum swing;

Figure 37 is a side elevation of a portion of the fabric, showing the various styles of the loops, double loops, piles and tufts, which are capable of being formed by my machine;

Figure 38 is an enlarged side elevation of a single presser foot;

Figure 39 is a plan view of Figure 38;

Figure 40 is an enlarged side elevation of a single feeder foot;

Figure 41 is a plan view of Figure 40;

Figure 42 is a front elevation of Figure 41, looking from the right hand side of Figure 41;

Figure 43 is a view of portions of the adjustable lever 161 or 166 on rods 90 and 91;

Figure 44 is a view of the stitches formed by a needle which has its eye portion disposed transversely to the line of stitches;

Figure 45 is a view of the stitches formed by my machine in which the eye of the needle is disposed parallel to the line of stitches.

Referring more particularly to the drawings, the numeral 10 indicates the base portion of the support of my machine, which has the upwardly projecting portions 11 and 12, and the upper portion 14, both ends of the support of the machine being identical. On this supporting structure I mount the longitudinally disposed members 15 and 16 and supported on the members 15 and 16 by means of lugs 17 and 18 is the channel member 19 and secured on the upper surface of this channel member 19 are the supports 20 and 21 and on the upper end of these supports 20 and 21 is secured the I-beam 22 by means of the bolts 23, the lower end of the supports 20 and 21 being secured to the channel member 19 by means of bolts 24. Secured to the upper surface of the I-beam 22 by means of bolts 25 are the transversely disposed channel members 26, which project rearwardly and are secured to vertical support 27, which support extends downwardly and is secured to the member 16, and secured on the top surface of the transversely disposed members 26 are the longitudinally disposed plates 28 and 29, on which are adapted to be supported a plurality of bobbins 30 and projecting upwardly from the end members 26 are the members 31, 32 and 33, which have the members 34 connecting their upper ends and in the upper ends of the members 31, 32 and 33 are secured the rods 35, which have the eye members 36 thereon, through which the thread 37 from the bobbins 30 is adapted to be passed on its way to the needles.

The ends of the members 26 opposite the ends to which the members 27 are secured have bolts 38 piercing the members 26 and running through tubular members 39 and threadably engaging the members 20 and 21.

On a suitable support 40 beneath the machine, I pivotally mount the pedal 41, which has the laterally projecting rod 42 extending from the front side thereof, which has pivotally secured on the end thereof the upwardly projecting rod 43, which has the adjusting nut 44 threadably secured thereon, the upper end of the rod 43 projecting through the lever 45, which lever is pivoted as at 46 in the support 47 mounted on the base portion 15a. The lever 45 extends laterally beyond the pivoted point 46 and has the downwardly projecting rod 48 pivotally secured thereto which rod slides in the support 49 and operates contact switch 50 which controls the current to the motor 51, the wire not being shown, but being of the conventional type. This motor 51 has the pulley 52 thereon on which the belt 53 is mounted. Projecting upwardly from the base of the machine are the supports 54 and 55 in which the multiple grooved pulley 56 and the plain pulley 57 and the brake pulley 58 are fixedly mounted on the shaft 59. Pivotally secured to the lever 45 between the point of engaging the rod 43 and the pivotal point 46 is the rod 60, which is pivotally connected with one end of the brake lever 61, said brake lever being pivoted as at 62 and having the end thereof adapted to engage the brake pulley 58. The spring 45—A tends to hold the brake lever 61 in applied position. The grooved pulley 56 has the belt 63 mounted thereon, which belt is adapted to engage the pulley on combined multiple pulley and flywheel 64 on the main driving shaft 65.

On the driving shaft 65 there is secured sprocket wheel 66 on which the sprocket chain 67 is adapted to be mounted for the purpose of driving the upper portion of the machine, which will be later described.

Secured to the rod 42 is the cable 68 which is led upwardly through the pulleys 69 and 70 and is secured to one end of a lever 71 and secured to this lever 71 at the same point where the cable 68 is secured thereto is the tension spring 72 which is fastened to the member 33 as at 73. This spring normally holds lever 71 out of engagement with lug 426, and also holds pedal 41 in neutral position, being stronger than spring 45—A.

The main drive shaft 65 has a plurality of cams fixedly mounted thereon, said cams being designated by the numerals 76, 77, 78, 79, 80, 81, 82, 83, 84, 85, 86, 87 and 88 and secured for oscillatory movement in the side wall portions of the channel member 19 are the transversely disposed shafts 90, 91, 92, 93, 94, 95, 96, and 97 and fixedly secured on these oscillatory rods 90 to 97 inclusive are the levers 100, 101, 102, 103, 104, 105, 106, 107, 108, 109, 110 and 111.

The main driving shaft 65 is supported in the ball bearings 112, 113, 114, 115, and 116 and plates 117 and 118 are secured on the top of the channel member 9 and project forwardly thereover and are secured to the member 19 by means of bolts or in any other suitable manner, and secured on these plates 117 and 118 are the four upwardly projecting bearing members 119, and these bearing members have secured therein bushings 120 in which the rods 121 and 122 are slidably secured and are disposed at right angles to the main driving shaft 65. These rods 121 and 122 have rigidly secured thereon the supporting member 123, which supporting member is disposed parallel to the main driving shaft 65 and serves as a support for the mechanism for gripping the threads and for pivotal points for operating means for the grippers and as a pivotal point for the support for the looping knife bar 154, all of which will be presently described.

Figure 4:
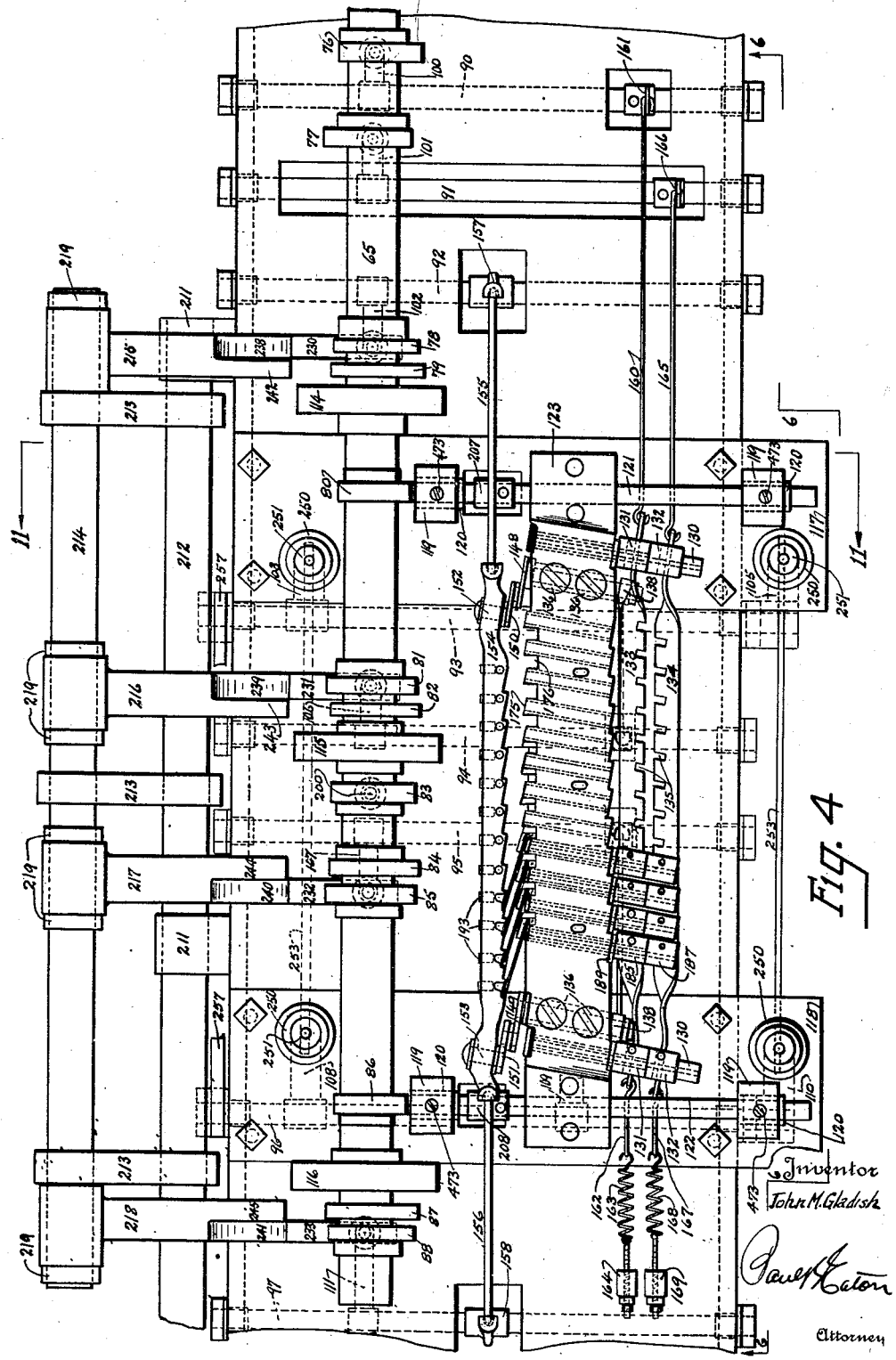
Figure 4 is an enlarged plan view of the lower portion of my machine with the cover plates omitted, and being taken along the line 4—4 in Figure 3.

By referring to Figure 4 the member 123 is shown spanning the distance between the slidable rods 121 and 122. This member 123 is secured to the rods 121 and 122 in any suitable manner, but I have shown blocks 124 and 125 secured on the slidable rods 121 and 122 with the member 123 being secured to said blocks by means of the screws 126. This member 123 and associated parts operate in a peculiar manner and the operation and co-operation of these parts will be hereinafter described, but for a better illustration of the same attention is invited to Figures 4 and 6 of the drawings in which there is shown the hollow bolt 130 on which the downwardly projection arms 131 and also the downwardly projecting arms 132 are pivotally mounted, the lower ends of the members 131 being pivotally connected with the bar 133 and the lower ends of the members 132 being pivotally connected with the member 134. These members 133 and 134 are similar to each other, having staggered notches 135 as shown in Figure 4. Vertically piercing the member 123 are the bolts 136 and secured to the member 123 on bolts 136 are the bearings 137 in which are mounted for oscillation the rods 138 and on the front end of rods 138 are fixedly secured the levers 140 and 141. The lower ends of the levers 140 and 141 have pivotally secured thereto the longitudinally disposed rod 143, which has pivotally secured at both ends thereof the rods 144 and 145 fitted to its ends by means of a socket connection and the other ends of the rods 144 and 145 are fitted in a similar socket connection to the upper ends of the levers 146 and 147, which levers are fixedly secured on the transversely disposed shafts 94 and 95.

On the opposite ends of the pins 138 from the mechanism just described are rigidly secured the levers 148 and 149, and to the ends of the levers 148 and 149 are pivotally secured the levers 150 and 151. The other ends of said levers 150 and 151 are fixedly secured to pins 152 and 153, said pins projecting through the member 154 which forms a support for the looping knives, which will be later described. The pins 152 and 153 oscillate with relation to the member 154 as will be later explained. The said mechanism gives a pivotal connection between the members 123 and 154. The member 154 has secured to each end thereof by means of a socket connection rods 155 and 156. The other ends of said rods are likewise secured in the upper ends of levers 157 and 158, which levers are fixedly mounted on the transversely disposed shafts 92 and 97. The member 133, which has previously been described, has secured to the end thereof (see Figure 4) the hooked rod 160, which has its other end hooked in the upwardly projecting lever 161 (see Figure 6) which lever is fixedly secured on the transversely disposed shaft 90, a portion of said lever being shown in Figure 43, with the central portion broken away, this lever being formed of two parts 161 and 161—A with a slot in 161 fitting over a bolt in 161—A whereby adjustment of the angularity of the lever may be effected to change the timing of the movement of the gripper controlled by this means. The other end of member 133 has a hooked rod 162 secured thereto to which is connected a tension spring 163, the other end of the tension spring being adjustably held in an upwardly projecting lug 164. The mounting for the member 134 is identical to that described for member 133, having the rod 165 secured to the lever 166 fixedly secured on the shaft 91, and being made similar to lever 161, previously described, to permit the other set of grippers to be adjusted and timed in their movement. The other end of the member 134 has the hooked rod 167 and the coil spring 168 secured to the lug 169.

The member 123 has a plurality of projections such as indicated by 175 forming a plurality of notches 176 therebetween, in which the members 177 are adapted to fit (see Figures 19 and 21), and the lower side of this member 123 has grooves 179 cut therein in which the portion 178 of the member 177 is adapted to be secured. The member 123 has a plurality of transversely disposed holes and said holes are set at an angle of less than 90 degrees on one side of the member 123 and more than a 90 degree angle on the other side, which makes them angularly disposed for purposes which will be explained later. In these holes I mount a plurality of pairs of hollow and solid bolts, designated by the numerals 180 and 181 (see Figures 22 and 25), and on the end of the bolt 181, furtherest removed from the operator (see Figures 20 to 25 and Figure 4) I fixedly mount the gripper 182 the upper end of which is adapted to press against the portion 183 of the member 177 (see Figure 19) to grip the thread while the needle is making its downward stroke and to hold the thread until the needle has completed its upward stroke; and on the hollow bolt 180 I secure the gripper 184, the upper portion of which is adapted to press against the portion 177—C of the member 177 and to grip the thread just before the needle has completed its upward stroke and to hold the thread after the needle has commenced its downward travel. The gripper 184 serves to hold the thread against the downward pull of the combined looping and cutting knife while loops are being formed and cut. The hollow rods 180 have secured on their forward ends (see Figure 4) the downwardly projecting levers 185, which extend downwardly and fit into one of the notches 135, on the member 133. The solid rod 181 has fixedly secured on the forward end thereof in close proximity to the lever 185, the lever 187, said levers 187 projecting downwardly and fitting into the notches 135 in the member 134. Suitable washers, which are indicated by the numeral 189, are placed on the hollow rods 180 next to the member 123 against which the members 185 fit.

The levers 185 and 187 are secured on the rods 180 and 181 as is best illustrated in Figure 6 by means of the set screws 190.

The member 154 which has been previously described in part has a plurality of notches on one side thereof, the face portion of which notches are parallel with the outer edges of projections 175 on the member 123 and at the base portion of these notches there is a vertically disposed hole piercing the member 154 in which the shank 191 of the looping knife 192 is rigidly mounted by means of the set screws 193. This looping knife is of a peculiar construction, being made of a very flexible steel, the front portion of which, as indicated along the line 35—35 in Figure 34, is dull so that when it is desired to form loops without cutting the same to form tufts, the machine can be so regulated by adjusting the length of swing of levers 146 and 147, as is later explained, that only this dull portion will travel in the path of the thread. This knife has a sharpened portion as indicated along the line 36—36, Figure 34 which is adapted to cut the loops and form tufts when the looping knife is permitted by a proper adjustment of the machine by the operator to travel further out into the line of stitches and this looper 192 has the serrated portion as indicated by the numeral 196 in Figure 34, said serrations serving to pull the loose material away from the operating mechanism of this portion of the machine. This looping knife 192 moves between the two grippers 182 and 184 in the slot indicated by 197 (see Figure 23), and these serrations just mentioned serve to pull the loose materials from between these grippers and from a distance in front thereof.

The looping knife 192 slides in the guideway 197 between the grippers 182 and 184 and the extreme end of the said knife also bears against the portion 177—B of the member 177 for the next set of grippers or the left hand member 177 in Figure 26 of which only a small portion is shown, with the central portion of the looping knife supported on both sides by the grippers 182 and 184, and with the tip of the looping knife pressing against the portion 177—B of the next succeeding member 177, it is seen that the looping knife cannot be twisted while cutting the loops. Due to the combined looping and cutting knife being very thin and very flexible, support must be given thereto.

Another added advantage gained by having a very flexible combined looping and cutting knife is that the tip thereof strikes the cavity 377—B in the needle, this insuring that it will go between the needle and portions of the strand, thus insuring that each loop will be entirely cut when the machine is adjusted to cut the loops. The extreme flexibility of the combined looping and cutting knife makes it possible to adjust the same very close to the needle.

Description as to the manner in which the member 123 is fixedly secured to the rods 121 and 122 has been given and it has also been set forth that the members 133, 134 and 154 are connected to this member 123 for lateral movement therewith. This lateral movement is imparted to these members by means of the following mechanisms:

A vertically slidable pin 200 is mounted in the members 19 and 117 and the socket 201, the upper end of this pin fitting against the cam 83 on the main drive shaft 65 and the lower end of this pin fits against a set screw 202 mounted in one end of a lever 203, said lever being fixedly mounted on the longitudinally disposed shaft 204, which shaft has projecting upwardly from both ends thereof, the levers 205 and 206, the ends of these levers acting against downwardly projecting lugs 207 and 208 on the rods 121 and 122 respectively. The cams 80 and 86 on the main drive shaft have fitting thereagainst the ends of the rods 121 and 122. The cams 80 and 86 are similar both in shape and in position on the main drive shaft 65, and these cams fit against the ends of the rods 121 and 122 and push the rods to the left in Figure 11 or towards the front of the machine. The cam 83 is so positioned and shaped that it co-operates with the other two cams 80 and 86 by having a shallow portion against the pin 200, while the deepest portion of cams 80 and 86 are against the rods 121 and 122 to cause the parts to assume the position shown in Figure 11, in which the member 123 and associated parts are moved to their most forward position and upon a further one-half revolution of the main drive shaft 65 the cam 83 will force the pin 200 downward, which in turn forces the crank arm 203 downward and this forces the levers 205 and 206 on the rod 204 to the right in Figure 11 and moves the member 123 and associated parts rearwardly (see Figure 4). The various transverse movements of the members 133, 134 and 154 are all closely related to each other as well as the combined transverse and vertical motion of the member 154, but for purposes of description I will endeavor to first describe the movements separately of each part as much as possible.

Figure 3:
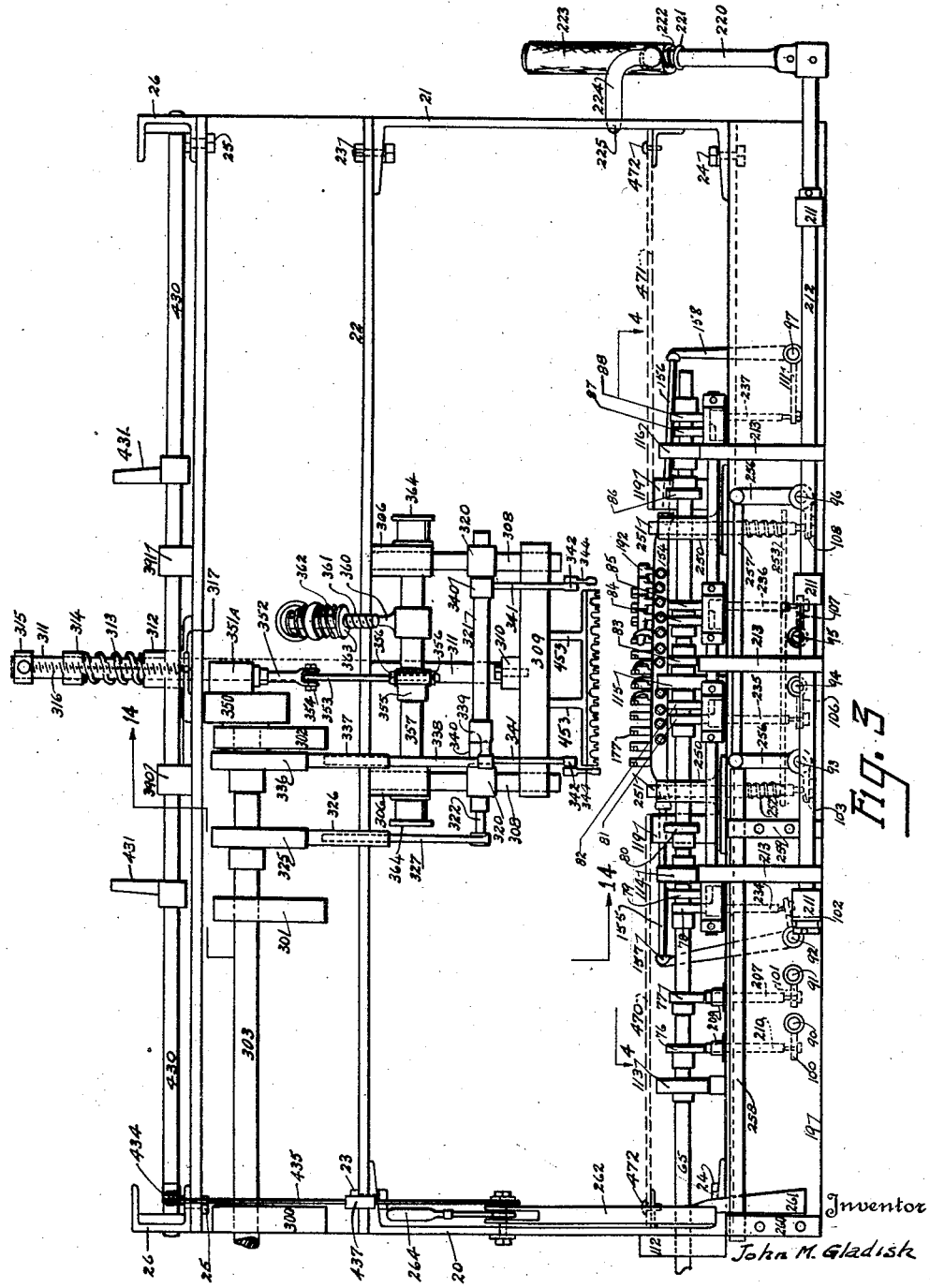
Figure 3 is a rear elevation of my machine with the support and driving mechanism and portions of the upper part of the machine omitted.

Since the back grippers 182 operate first upon the downward movement of the needle, I will describe the mechanism for the operation of these grippers which consists of the cam 77 on the main drive shaft, which presses against a pin 207 which is mounted for vertical sliding movement in the members 19 and the socket 209 and the upper end thereof fits against the cam 77 and the lower end thereof fits against a set screw in the crank 101 on the rod 91 (see Figures 3, 4 and 5). This downward forcing of the pin 207 presses the lever 101 downwardly and in turn oscillates rod 91 together with the upwardly projecting lever 166 which moves the rod 165 in a right-hand direction as seen in Figure 4 and likewise causes the member 134 to move to the right, which moves the levers 187 on the rods 181 (see Figure 6) and causes the upper portion of the gripper 182 to move away from the point 183 (see Figure 29) and release its grip on the thread, and of course, it is evident that when the drive shaft has made another one-half revolution that the tension spring 168 will pull the parts back to original position and cause the gripper 182 to press against the point 183 which holds the thread. The cam 76 on the drive shaft 65 likewise depresses the pin 210 (see Figure 3) which forces the lever 100 on the rod 90 downward and causes the upwardly projecting lever 161 (see Figures 4 and 6) to move to the right in Figures 4 and 6, which will communicate said right-hand movement to the member 133 through the rod 160, thus oscillating the levers 185 on the hollow bolts 180 and cause the gripper 184 to move away from the point 184—A on the member 177, it being evident that when it is resting against this point that it will grip the thread as it is passed around the looping knife, and the needle has passed above the point 184—A. The rod 162 and the coil spring 163 secured to the lug 164 have a normal tendency to hold the gripper in closed position against the point 184—A and it is this cam movement, which has just been described, which causes the said gripper to release it hold on the thread.

In Figures 4 and 11 we have the projections 211 in which the shaft 212 is rotatably mounted and fixedly secured on this shaft are the levers 213 and fixedly mounted in the upper ends of the levers 213 is the shaft 214, on which there are loosely secured the members 215, 216, 217 and 218, which are held in position by the fastening means 219. The rod 212 extends outwardly beyond the end of the machine and has secured thereon the arm 220 to which is fixedly secured the member 221, and to this member 221 there is secured the coil spring 222, the other end of the coil spring being hooked around the hook 224, and on this member 220 there is rotatably secured the handle member 223, which has the hooked member 224 integral therewith and which hooked member is adapted to fit into a hole 225 in the member 21 to hold the parts in the position shown in Figure 4 and Figure 11, but when it is desired to move the members 215 to 218 inclusive, forwardly then the handle 223 is pressed downwardly and causes the hook 224 to disengage itself from the hole 225 and automatically enter the hole 226 to hold the parts in adjusted position to limit the swing of the looper knife to form loops only.

In Figure 4 the cams 78, 81, 85 and 88 are pressing against the portions 230, 231, 232 and 233 of the members 215 to 218 inclusive, and fitting against the lower side of the portions 230 to 233 inclusive are the pins 234, 235, 236 and 237, the lower ends of which press against set screws in the ends of levers 102, 106, 107 and 111, which are fixed respectively on the shafts 92, 94, 95 and 97. This means that the levers 157 and 158 are moved in unison by the cams 78 and 88 and likewise the cams 81 and 85 produce unitary movement of the levers 146 and 147 (see Figure 6), causing the levers 146 and 147 to swing together to the right and left, which movement is imparted to the member 143, thus imparting oscillatory movement to the levers 140 and 141, which imparts oscillatory movement to the pins 138 on the opposite ends of which are rigidly mounted the levers 148 and 149 (see Figure 4). This gives an oscillatory motion to the levers 148 and 149, which are pivotally connected with the levers 150 and 151 which are secured to the pins 152 and 153, mounted for oscillatory movement in the member 154 and it is seen that this oscillatory movement imparts, through the mechanism just described, an approximately elliptical motion to the member 154 which imparts a similar motion to the looping knives causing the looping knives along the upper portion of their stroke to move in an approximately horizontal plane, then downwardly and backwardly, which can best be described as an approximate rectangular movement with the upper forward and lower rearward corners of it, having a curved surface, which motion is illustrated in Figures 26 to 31 inclusive.

The motion just described with the parts in position as shown in Figures 3, 4 and 11 imparts to the looping knife its maximum path of movement whereby the sharpened portion of the knife comes into contact with the formed loops and cuts the same, thus forming a tuft or pile.

When it is desired to form loops on the lower side of the fabric and not cut the same, the handle 223 is pulled downwardly until the hook 224 engages the hole 226, thus turning the rod 212 together with the levers 213 and forcing the rod 214 and the members 215 to 218, which are loosely mounted thereon, inwardly until the cams 78, 81, 85 and 88 respectively take a position directly over hollowed out portions 238, 239, 240 and 241, which means that the cams 79 and 87 are resting on the portions 242, and 245 of the members 215 and 218, and as a result of the cams 79, and 87 being of a peculiar formation to impart a lesser downward movement on the pins 234 and 237, a lesser swing is given to the levers 157 and 158, which likewise imparts a lesser movement to the member 154 and the looping knives 192 located thereon, and the levers 146 and 147 are held in stationary position due to the fact that members 82 and 84 are made in a true circle which of course does not impart any motion to levers 148 and 149, but causes them to be held in a stationary position so as to cause the pivotal connecting point between the levers 148 and 150 and the levers 149 and 151 respectively to be held as far to the left as possible, so as to prevent the knife carrying member 154 from having its maximum swing to the right, and also eliminating the downward swing of the knife while the same is receding.

When the loopers travel far enough to cut the tufts they also have a movement backward and forward with respect to the operator, this motion being transmitted from member 123 to member 154 through the levers 148 to 151 inclusive.

Figure 1:
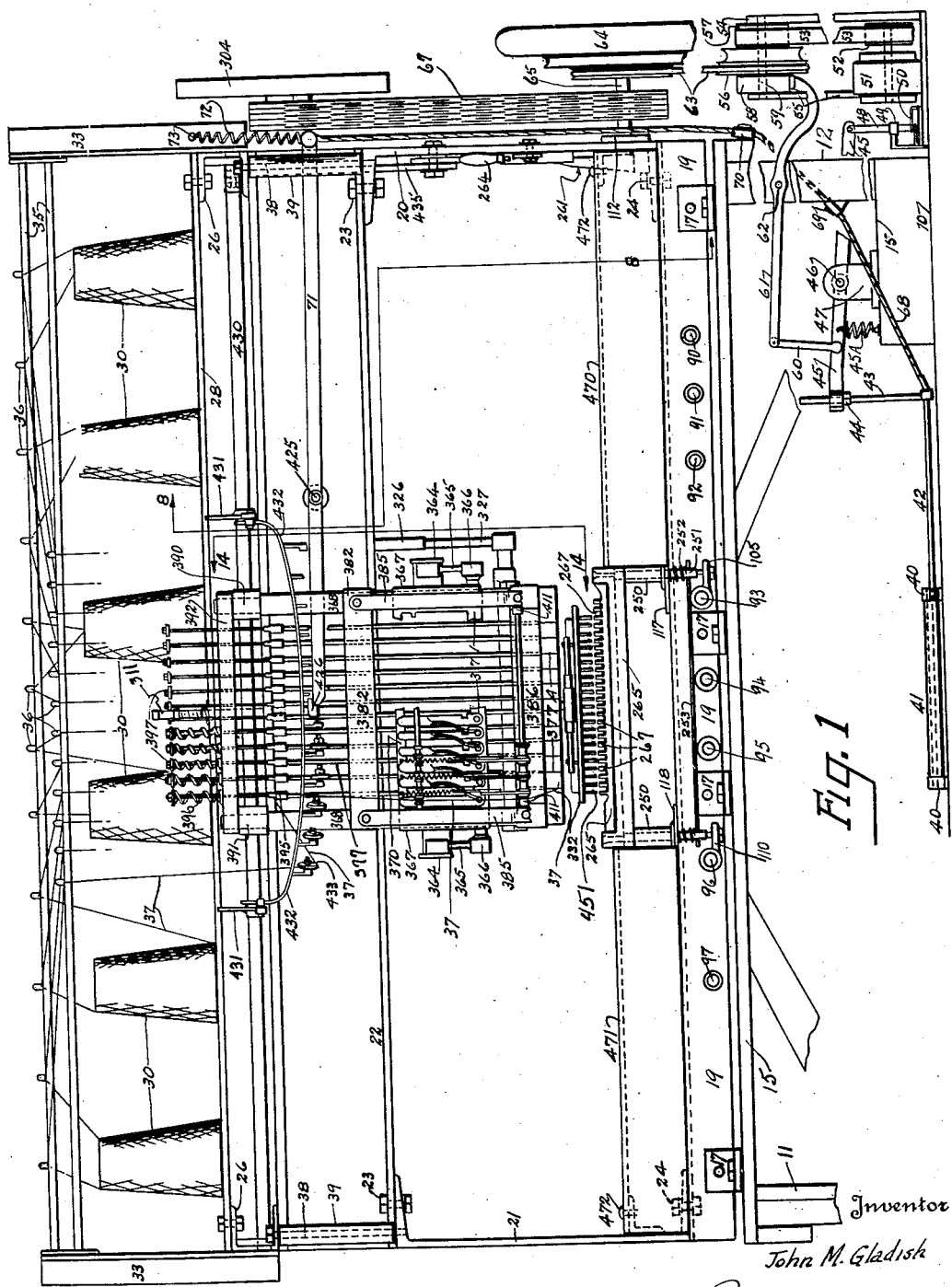
Figure 2:
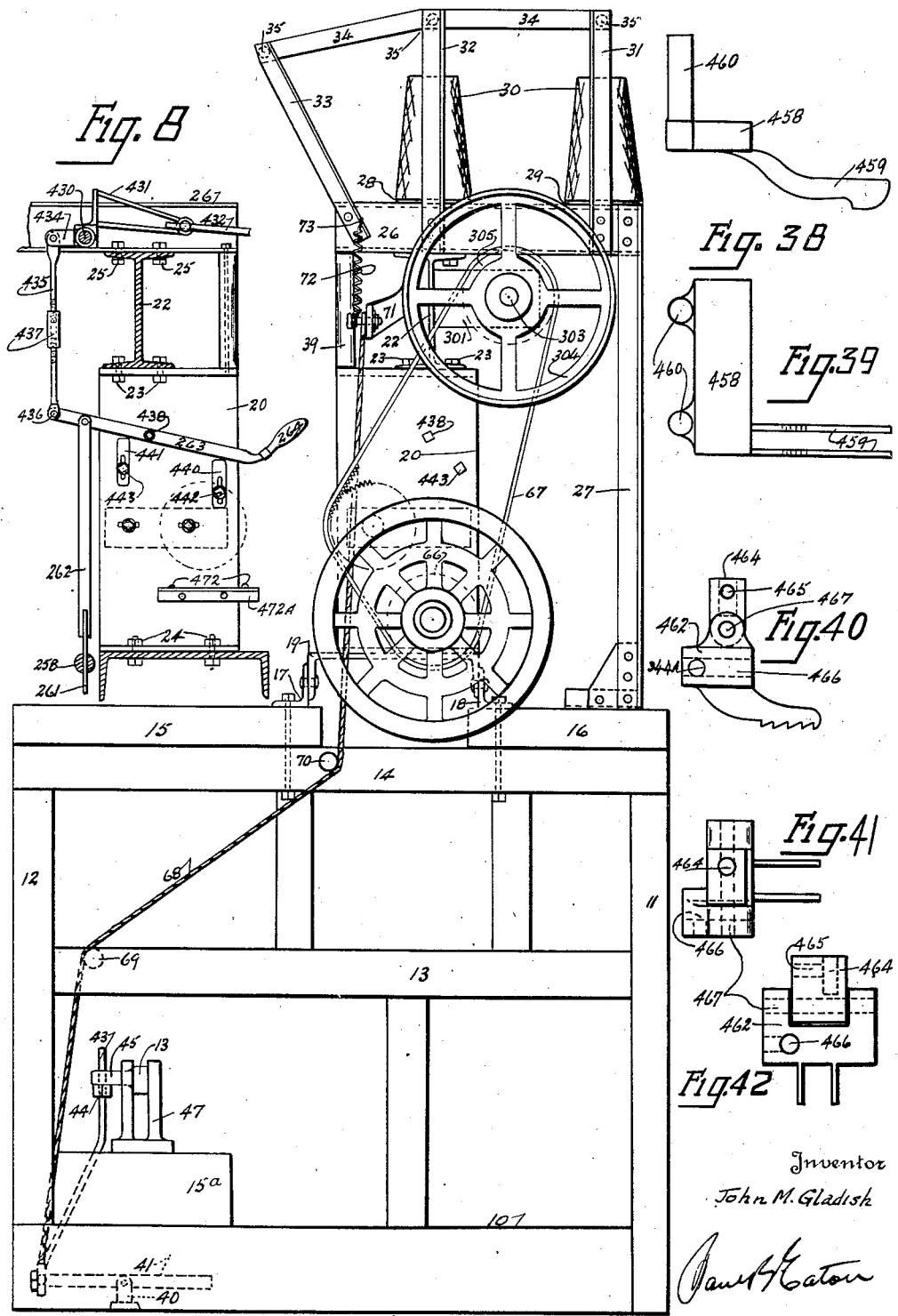
Figure 2 is an end elevation of the right hand end of my machine with the motor and associated parts omitted.

Secured on the plates 117 and 118 are the four bushing members 250 in which the vertically disposed pins 251 are slidably mounted and on the lower end of these pins are the coil springs 252, they being secured thereon by an intersecting pin 253, and the lower ends of the pins 251 fit against set screws in the end of the levers 108 and 110, located on the rod 96 and the levers 103 and 105 on the rod 93. These rods 93 and 96 have the upwardly projecting levers 256 secured on the rear ends thereof as seen in Figure 3. The upper end of the levers 256 are pivotally secured to each other by means of the rod 257. Mounted in a longitudinal position on the rear of channel bar 19 is the rod 258 which is slidably mounted in the bearings 259 and 260 and this rod has a slot therethrough in which the wedge-shaped member 261 is adapted to slide vertically. The upper end of this wedge-shaped member 261 is connected to the rod 262, which is pivotally connected to the lever 263, the lever 263 being pivoted as at 438 and having the handle 264 thereon so that when that handle member is given a downward pull the wedge-shaped member 261 will be raised upwardly and will force the rod 258 to the right in Figure 3 and likewise force the levers 256 to the right and thus raise the pins 251 upward. The throat plate 265 (see Figure 11) is secured to the top of these pins 251 by means of the set screws 266. A front elevation of the throat plate is seen in Figure 1, and a cross-sectional view is shown in Figure 11, which has openings 267 therein through which the needles are adapted to pass. In addition to the means just described for supporting the throat plate, I provide the bar 268, which has the upwardly projecting pins 269 which project upwardly through the member 19 in a suitable guideway as illustrated at 270 in Figures 6 and 11. The pins 271 pierce holes in the member 123 which are elliptical in cross section so as not to interfere with the movement of the member 123 with the rods 121 and 122 for backward and forward movement of member 123. The lower ends of these pins 271 rest on the plate 268, and the upper ends support the central portion of the throat plate.

In the upper portion of the frame work and on the rear side of the I-beam 22, I secure the bearings 300, 301 and 302 and in these bearings is rotatably mounted the shaft 303 which is adapted to drive the mechanism in the upper portion of the machine as will be later described. On the outer end of this shaft I secure the flywheel 304 which has the sprocket 305 secured thereon and the sprocket chain 67 is adapted to engage this sprocket 305. To the lower side of the I-beam 22 the blocks 306 are secured by means of the bolts 307 or any other suitable means, as shown in Figure 14 and threadably secured in the blocks 306 are the downwardly projecting shafts 308 and slidably secured on the downwardly projecting shafts 308 is the cross piece 309 and secured to the central portion of the member 309 is the block 310, which projects forwardly toward the operator and has fixedly secured therein the shaft 311, which shaft projects upwardly through the lower and upper forward flanges of the I-beam 22 and is slidably mounted in the bearing member 312 and the said rod 311 projects upwardly from said bearing member and has rigidly secured therearound the compression spring 313, and the cuff 314 is adjustably secured on the said shaft 311 at the upper end of said spring and the cuff 315 is secured on the upper end of shaft 311 to which cuff 315 is fastened the tension spring 316 which spring projects downwardly and backwardly and is secured to the support 317 secured on the rear upper flange of the I-beam 22, the spring 313 having a tendency to push the shaft 311 upwardly and the spring 316 having a tendency to pull the shaft 311 downwardly so as to balance the presser and feeder foot, and to permit adjustment of pressure of said mechanism on the fabric.

The blocks 320 are slidably secured on the shaft 308 and project rearwardly and on the rear ends of these blocks 320 is rotatably mounted the hollow shaft 321, and rotatably mounted in the hollow shaft 321 is the solid shaft 322. The drive shaft for the mechanism of the upper portion of the machine, which has previously been designated by the numeral 303 has the cam 325 secured thereon (see Figures 3 and 14) and surrounding this cam is the connecting rod 326 which is tubular in its lower portion and has the rod 327 fitting in said tubular portion, which rod extends downwardly and is pivotally secured on the solid rod 322 and has the crank arm 328 projecting forwardly and has pivotally secured on the forward end thereof the presser foot actuator 329, the member 329 being secured to the bearing member 330 by means of the set screw 330—A (see Figure 10) in which is mounted the cross pin 331 on which is mounted for oscillatory movement the feeder feet frame 332, said feeder feet frame being connected to the rod 331 by means of the cuff 333 and set screws 334 as is shown in Figure 10, the feeder feet proper being indicated by the reference numeral 335.

The drive shaft 303 has a cam and connecting rod mounted thereon, which is indicated in Figure 3 by the reference numeral 336, this cam and connecting rod being of identical structure to the structure set forth in Figure 14 and being indicated in Figure 14 by the reference numerals 325 and 326. The lower portion of this latter cam and connecting rod is indicated by the reference numeral 337 (see Figure 3) and is tubular and the member 338 is slidably mounted therein. The member 338, which projects downwardly and swerves to the right in Figure 3 is fixedly mounted on the hollow shaft 321 and also fixedly mounted on the shaft 321 are the cuffs 340, which have projecting downwardly therefrom the crank arms 341, which have pivotally mounted on the lower end thereof as at 342, the rods 344, which have their forward ends (see Figure 14) rigidly connected to the feeder foot mechanism as at 345 by means of the set screw 344—A. The blocks 309 and 320 are secured to each other by the portion 309—A so that when the arm 328 is pressed downwardly and the arm 341 is pressed rearwardly at the same time, the arm 328 having a greater relative movement than the arm 341, the feeder feet 335 will be pressed downwardly on the fabric and backwardly, due to the greater movement of the arm 328 and this in turn, due to the fact that 320 on which the feeder foot mechanism is mounted and the member 309 on which the presser foot mechanism is mounted are secured together causes 309 and the presser foot to be raised upward at the time that the feeder feet are pressed downwardly and backwardly.

The shaft 303 has mounted on the end thereof the disc 350, which has eccentrically mounted thereon the pin 351 on which is pivotally mounted the rod 352, the other end of the rod 352 being pivotally connected to the arm 353 as at 354, which arm 353 is forked, the forked portions being adjustably mounted in the block 355 by means of the adjusting nuts 356, said block 355 being rigidly secured on the shaft 357. The rod 352 is also adjustable as to length by threadably engaging the block 351—A and being secured in adjusted position by the lock nut 351—B. The arm 360 is rigidly secured on the shaft 357 and projects upwardly and rearwardly and has the bolt 361 penetrating its upper portion and also has the spring 362 penetrating the upper portion of said arm 360, the spring 362 being wedged therein to prevent relative movement between the spring 362 and the arm 360, the spring 362 being mounted around the rod 361. One end of the rod 361 is rigidly secured to the I-beam 22 by means of the nut 361—A and the other end of the bolt 361 has the nut 363 secured thereon to hold the spring under the proper adjusted compression. The purpose of this spring and arm just described is to cause the shaft 357 to have a resilient action at all times. This shaft 357 has rigidly secured thereon the arm 364, as shown in Figures 1, 3 and 14, which projects forwardly and has pivotally connected to its forward end the connecting link 365, which link projects downwardly and is pivotally connected as at 366 to the vertically movable slide 367. These slides 367 appear at both sides of the machine and are slidably mounted on the vertically disposed rods 368, the mounting of which will be presently explained. Extending between these slidable members 367 are the bars 370 and 371, which have fixedly mounted thereon the vertically disposed bars 372 by means of screws 373 and 374, which bars have the notches 375 in the lower portion thereof as indicated in Figure 12 and these bars 372 are spaced apart from each other to form a passageway in which the lugs 376, secured on the needle bars 377, are adapted to reciprocate vertically, the mounting and operation of which will be presently explained.

Each of the vertically disposed members 372 has secured on its upper portion a leaf spring 378, which spring projects downwardly and to the left as shown in Figure 12 and fits snugly against the grooved portion of the screws 374 and in front of the notch 375 on the adjacent vertical member 372.

Secured through the I-beam 22 (see Figure 14) is the bolt 380 which has the elongated washer 381 therearound fitting on the forward side of the I-beam 22, said bolt piercing the longitudinally disposed member 382 and on the left hand side as shown in Figure 14 of the member 382 the nut 383 threadably engages the bolt 380 to rigidly secure 382 in position, and the washer 384 is then placed around the bolt 380 and the vertically disposed members 385 are secured on the bolt 380, which members extend downwardly and are secured to a longitudinal member 386 by means of the washer 387 and the bolt 388. This lower member designated by 386 is similar to the member 382. The members 382 and 386 have a plurality of holes therethrough, in which the needle bars 377 have their vertical sliding movement.

Secured on the top of the I-beam 22 are the members 390 and 391 through which the members 368 are passed and are secured therein by any suitable means and resting on top of members 390 and 391 and spanning the distance therebetween is the longitudinally disposed member 392, which has a plurality of holes therein through which the extension portions 394 of the needle bars 377 are passed. These extension portions of the needle bars are secured in the upper ends of the needle bars proper by means of the upper end of the needle bars being tubular and the extension portions 394 fitting thereinto and being secured thereinto in any suitable manner, and mounted on the upper portion of the needle bars 377 are the thread carriers 395. The extension 394 of the needle bars project upwardly beyond the member 392 and loosely placed around these extensions are the compression springs 396 and on the upper end of the extensions 394 are placed the washers and nuts by means of which the tension of the springs 396 can be regulated. These springs hold the needle bars 377 in elevated position when they are inoperative.

Secured between the vertically disposed members 385 is the rod 400 which has rigidly secured thereon, between the members 385, the hollow rod 401, which has a series of circular flange members in sets of two, these flange members being designated by 402 and 403. This leaves a broad groove 404 and the narrow groove 405. The large grooves 404 serve as a passageway and guide for the thread 37 on its downward travel to the needles, while the narrow grooves 405 serve as a guide for the upper end of the member 406, the upper end of which is forked (see Figures 12, 13, 15 and 16). This sliding member 406 extends downwardly and is pivotally connected to an intermediate portion of the hand lever 408, by means of the screw 409 being secured in the lever 408 and the hook 410 of the member 406 being adapted to hook over the screw 409. The members 386 have the projections 411 thereon in which the rod 412 is mounted in the same manner that the rod 400 is mounted, as previously described and around this rod 412 there are secured a plurality of spacers 413. The rod 412 pierces the holes 414 in the hand levers 408 and the spacers 413, these spacers being placed between the levers 408 and having a circular groove in the central portion to act as a guide for the thread. The members 406 project vertically downward and the levers 408 are secured to the side thereof, in the manner previously described, so that the hand levers are spaced slightly to the left of the vertical plane of the members 406. The members 406 have on the back portion thereof the lug 415, which has the two projecting portions 416 and 417.

If the projection 376 on the needle bar is in one of the notches 375 as shown at the left hand side of Figure 12 while the members 370 and 371 and associated parts are reciprocating up and down while in operation and the hand lever 408 is pushed upwardly, this will cause the portion 416 to travel upwardly and inwardly until it enters the path of vertical movement of projection 376. It will be in a position where the needle bar on its upward movement will cause the projection 376 to strike the face of the portion 416 and will force the projection 376 out of the notch 375 and cause the projection to travel behind the member 406 and the spring 396 on the top of the needle bar will cause this needle bar to remain in an inoperative elevated position, the hand lever 408 being released by the operator when this disengagement takes place. When it is released, the hand lever 408 and the member 406 are caused to reassume their inoperative position by means of the tension spring 420 being secured in a hole 421 in the member 406 and the other end of the spring being secured to the hook 422, which has its base portion secured to the member 403 as indicated by the reference numeral 423 in Figure 12.

When it is desired to throw any one of the needle bars into operative position, the hand lever 408 is depressed and the lug 417 comes downwardly and engages the projection 376 on the selected needle bar and forces it and the needle bar downwardly against the side of the leaf spring 378, which leaf spring causes the projection 376 to travel inwardly behind the member 406 and to become engaged in the notch 375 where it is held in position by means of the lower end of the spring 378. It is evident from the description, that the members 370 and 371 to which are attached the members 372 and associated parts have a continuous reciprocating motion up and down, while the members 406 and associated parts are stationary and this is what causes the projections 376 on the needle bars to come into contact with the lugs and leaf springs as described. All of the needle bars are rendered operative or inoperative as above described for one of the needle bars. I have shown in the drawings only four sets of grippers and looping knives and associated parts, and have omitted the remaining sets for sake of clearness.

It has been previously described as to the manner in which the lever 71 is operated from the pedal 41. This lever 71 is pivoted as at 425 and the end of this lever projects outwardly and is adapted to engage a lug 426 attached to the vertically slidable shaft 311, which supports the presser foot and feeder foot by the mechanism previously described so that it is seen that when it is desired to raise the presser and feeder foot mechanism for the purpose of inserting and withdrawing fabrics, the pedal 41 is pressed downward at the forward portion next to the operator which pulls the cable 68 downwardly as previously described and causes the lever 71 to raise the presser foot mechanism, which has just been described.

Pivotally secured in the upper end portions of the frame work of the machine is the longitudinally disposed rod 430 which has securely mounted thereon the arms 431, on which the ends of the support 432 are adjustably mounted, this member 432 having a plurality of tension regulating devices 433 through which the strands of yarn are passed on their way to the needle. This rod has the crank arm 434 secured thereon, which has the rod 435 pivotally secured thereto, the lower end of the rod 435 being connected to the lever 263 as at 436, and this rod 435 is adjustable as to length by means of a turnbuckle arrangement 437 or any other suitable length adjusting mechanism.

The lever 263 which is pivoted as at 438 is adapted to simultaneously raise or lower the throat plate through the rod 262, as has been previously described while at the same time regulating the elevation of the thread support 432 so that it is seen that when the lever 263 has its handle portion 264 raised that it will lower the throat plate and raise the thread support at the same operation and when the handle 264 is pulled downwardly, it will lower the thread support and raise the throat plate, the purpose of which is to regulate the supply of the thread so as to regulate the length of the loops, both on the bottom and top of the fabric as is shown in Figure 37 in which the position A indicates the type of loop formed on the lower side of the fabric when the thread support is raised and the throat plate is lowered, and the section B indicates the type of loops formed when the length of stroke of the needle bars is increased in its upward direction, and the lower portion of said strokes remaining the same. This is accomplished by shortening lever 356 and lengthening lever 352, while the section C indicates the type of loop made with the same adjustment as in section B, but with the looping knife adjusted to travel its full length to cut the loops on the lower side of the fabric, while section D shows the type of loop or tuft formed when the thread support is lowered with a likewise greater raising of the throat plate. By referring to Figure 8 of the drawings it will be seen that I have provided the members 440 and 441 which are slotted to receive bolts 442 and 443 so that these projections 440 and 441 can be adjusted to hold the lever 263 in the desired adjusted position.

The presser foot is designated by the numeral 450 and has a plurality of downwardly projecting members 451, the members 450 and 451 being secured together by means of screws 450—A, the members 451 being spaced apart from each other so that the portions 451 fit into the space indicated by the numeral 452 between the feeder feet (see Figure 10). In Figure 10 I have shown the presser foot 450 dropping down out of the position in which it is shown in Figure 14. The position in Figure 14 is the correct position. This showing in Figure 10 is made for purposes of clearness. The presser foot portion 450 has the upwardly projecting portions 453, which are adapted to be secured in the vertically disposed holes 454 in the member 309 and are secured therein by means of the screws 455 (see Figures 10 and 14), and in the upper ends of the holes 454 are secured the plugs 456 by means of set screws 457. The purpose of these plugs is to adjust the maximum height to which the presser foot can be adjusted without re-adjustment of the plugs 456, which permits the operator to merely place the presser foot in position until the portions 453 fit against the plugs 456 and then tighten the screws 455 to secure the same in position. This is done in order to insure that the presser foot will at all times retain the same adjustment when changes are made from this multiple presser foot to the single presser foot, which I have shown in Figures 38 and 39 and which is indicated by the reference numeral 458. This single presser foot has the forwardly projecting presser portion 459 and the shanks 460, which are adapted to fit into the left-hand hole 454 in Figure 10, and also in the hole 461, which is similar to the hole 454 and has a similar adjusting means comprising plugs in the said holes.

In Figure 10 I have shown a multiple feeder foot 332, which is secured to the portion 329 as at 330—A and this feeder foot, as previously described, is also secured to the reciprocating members 344 (see Figure 14) by means of the set screw 344—A and it is also secured to the arm 328 through the supporting member 329, which is mounted for oscillatory movement in the forward end of 328 and this portion 329 projects downwardly where it is joined to the multiple feeder foot as at 330—A, which has been previously described.

When I desire to use only one of the needles and have installed the single presser foot 458, (see Figures 38 and 39) I also remove the multiple feeder foot 332 by loosening the set screws 330—A and 344—A and then I secure the single feeder foot 462 in position in the following manner:

In Figure 10 I have shown the downwardly projecting portion 463 projecting downwardly from the member 329, and when I install the single feeder foot the upper hollow portion 464 fits over this projection 463 and is secured thereon by a suitable set screw fitting into the hole 465. In the hole 466 I secure the left-hand member which is similar to 344 shown in Figure 14, in the said hole 466 by removing the set screw 344—A for the removal of the multiple feeder foot and adjusting the single feeder foot in the same manner. This means that the right-hand member 344 is removed from the portion 341 and the single feeder foot is operated solely from the left-hand member 341, and the projection 463 on the member 329 as shown in Figure 10. The portion of the feeder foot which has the vertical hollow 464 therein, projects downwardly and the feeder foot proper 462 is pivotally mounted on the upper portion as at 467, which is a similar movement to the motion between the member 330 and 332 in Figure 10 when the multiple feeder foot is used. This single feeder foot is so designed as to permit the fabric to be turned sharply while the machine is in operation.

In Figures 26 and 33 I have shown in a progressive manner in rear views, one of the plurality of means for forming the piles and loops and showing the action of the grippers and the looping and pile forming knife during the travel of the needle vertically through the fabric. In Figure 26 I show the needle approaching its lowermost position with the gripper 182 which is the gripper farthest away from the operator of the machine, gripping the portion 37—A (see Figure 37) of the thread while the next loop is being formed and in this position the looping knife 192 is in position shown in Figure 26. In Figure 27 I show the needle beginning its upward stroke with the looping knife 192 sliding between the grippers 182 and 184 in the guideway 197, shown in Figures 23 and 25, and going between the thread and the needle which grippers serve as a guide for the looping knife and permit the looping knife to be made of a very flexible steel, and we see the end of the looping knife striking the cavity 377—B in the needle, just above the eye thereof (see Figure 14) with the gripper 182 securely gripping the portion 37—A of the preceding loop. In Figure 28 we see the needle 377—A approaching the end of its upward stroke after having formed a loop by means of the looping knife having entered in front of the downwardly drawn portion of the thread and to the rear of the upwardly drawn portion of the thread, and when this operation has been completed the front gripper 184 grips both portions of the last formed loop, as shown at 37—B and 37—C in Figure 37, and in the position shown in Figure 28 the dull portion of the looping knife is in position on the thread and if the machine is adjusted permitting no further lateral movement of the knife, then only loops will be formed, but if the handle 220 is in the position in Figure 7, the mechanism is adjusted as shown in Figure 4 with the cams 78, 81, 85 and 88 pressing on the portions 230, 231, 232 and 233 and then the knife will be swung out to the position shown in the dotted line 192—A Figure 28 and then downwardly as shown by dotted lines 192—B to cut the thread, due to the fact that the sharpened portion of the knife comes into engagement with the loop, and the knife then travels rearwardly to assume its original position. In Figure 29 I have shown the position of the grippers when the needle is in approximately its highest position with the loop formed or severed in accordance with the adjustment of the driving mechanism and with the knife beginning its rearward travel back to its original position where we see the serrations on the knife traveling through the guide 197 between the grippers and pulling any lint or waste from between the grippers and also clearing the space where loops are formed from any lint. In Figure 30 the position of the grippers and the looping knife is shown when the needle is piercing the fabric with the looping knife not yet returned all the way to its original position, while in Figure 31 we see the looping knife withdrawn from the path of the needle, with the needle having penetrated the fabric and starting its downward movement below the fabric with the back gripper gripping the upward drawn portion of the last stitch and the downwardly drawn portion of the new looping which is being formed, which brings us back to Figure 26 which shows the next step. I have described only one set of grippers, looping and cutting knife and associated parts, the other eleven sets being identical, and while I have shown only twelve sets, it is evident that any number of sets can be provided in a machine if desired.

In Figures 19, 20, 20—A and 21 I show the sloping portion 177—C, which is also shown in Figures 26 to 31 inclusive which permits room for the already formed loops to swing away from the line in which they have been formed should there be any tendency of the looping knife to mutilate the same and on the member 177 I also show the small cavity 177—D, which permits room for the thread on the side of the looping knife next to the operator or the upwardly drawn portion of the loop so that when the looping knife enters between the two portions of the thread the forward portion of the loop next to the operator may be pressed backward into this cavity 177—D to permit the knife to press against 177, which acts as a support and directing surface for the looping knife to prevent the same from being warped or broken and on the lower portion of the rear wall portion of the member 177 I show the inclined portion 177—B, which acts as a space for the heel of the grippers, and the similar sloping surface 177—A is provided on the opposite side of the member 177 from the portion 177—B and at a higher elevation thereon which surface permits the looping knife of the preceding set to make its entire forward travel without the end thereof coming into engagement with the member 177.

The curved rib 177—E is provided, as shown in Figure 19, so that if the needle should strike too far forward it will strike against this rib and be directed back into its proper path, and the projection 182—A is provided on the gripper 182 and has the sloping surface 182—B for the purpose of directing the needle forward into its proper path, should it swing too far to the rear.

Cover plates 470 and 471 are secured over the lower part of the machine by means of screws 472 fitting into lugs 472—A on the members 20 and 21 and the portions of these cover plates which rest on the central portion of the machine on each side of the throat plate are supported on the members 119 and are secured thereto by any suitable means, these cover plates being omitted in all of the figures except in Figure 1 for better illustration.

By referring to Figures 1, 8 and 37 I desire to explain the manner in which I form the loops B and C as shown in Figure 37. It will be seen that in Figure 1 the thread guide support 432 is adjusted in a very low position so that the thread holder 395 on the needle bars 377 travels to a point well above the horizontal plane of the thread support with the thread passing through tension means 433, which means that the thread 37 is pulled through these members 433 during the travel of the members 395 on the needle bars all of the time after these members 395 reach the horizontal plane of the thread support on their upward travel and thread is also pulled through the members 433 during the downward stroke of the needles and needle bars, which means that a greater length of thread will be drawn through the members 433 with the thread support adjusted as shown in Figure 1 than would be drawn through were the thread support raised to a point above the horizontal plane of the maximum upward travel of the members 395.

By having a greater amount of thread pulled through the members 433 it follows that the needle during its downward stroke through the fabric to form the loop on the lower side of the fabric will not take up all of the thread which has been pulled through the members 433 and as a result loops will be formed on the upper side of the fabric as shown in Figure 37 and the length of these loops is adjusted by the adjustment of both the thread support 432 and the throat plate 265. As previously described, when the thread support 432 is lowered the throat plate is raised, thus making a longer loop or pile on the bottom of the fabric and should it be desired to make a relatively longer loop or shorter loop on the top of the fabric than the one on the bottom of the fabric this can be effected by adjusting the member 432 with relation to its support 431, which makes the members 433 travel in a longer or shorter arc when the member 432 is slid inwardly into the member 431 and the member 432 may also be adjusted angularly with relation to the support 431 to regulate the height of the same without interfering with the elevation of the throat plate, when it is desired to adjust the length of the loops on the top of the fabric without interfering with the adjustment of the length of the loops on the bottom of the fabric.

In the drawings I have shown the needle bars spaced apart from each other and this space can be of any desired breadth in each machine manufactured, and where the needle bars are positioned close to each other a complete fabric will be formed in which the rows of loops or piles will have their side portions in contact with each other thus hiding the base fabric from view, or the needle bars can be spaced apart from each other in the manufacture of the machine to leave blank unstitched portions between the rows of loops or piles, in which case it will be necessary to go over the fabric the second time in order to make a fabric in which the base portion is obscured from view by the loops and piles. In case where the needle bars are close enough to each other to make a completely obscured base portion on the first operation, then the blank spaces can be left by throwing out of operation every other or alternate needle bars thus leaving furrows, when it is desired to make the alternate rows with one of them formed into loops and the intervening rows made into piles. This double effect is accomplished by first going over the fabric and forming spaced rows of piles or cut loops and then running the fabric thru the machine the second time and forming loops only, and in order to accomplish this it will be noted that the throat plate 265 has twice as many openings 267 as there are needle bars, which double number of openings are provided to allow the loops or piles formed in spaced rows during the first operation to pass thru the spaces 267 between the needles, through which openings the needles do not pass, as they pass only thru alternate openings. And the back portions of the grippers 182 and 184 are rounded at their upper ends so as to prevent their mutilating the rows of piles or loops which are passing thru the intermediate passageways between the needles.

In Figure 44 I have shown how the rows of stitches 500, 501 and 502 are formed on the fabric 503, where the eye of the needle is disposed transversely to the line of stitches and it is here seen that the stitches have a tendency to press laterally towards the other rows of stitches and are therefore not held as tautly as in Figure 45, where I show the rows of stitches 504, 505 and 506 formed in the fabric 507, which are made with my machine having the eye of the needle disposed in alinement with the rows of stitches. Here it is seen that the tendency of the strands of the stitches to press away from each other causes them to press in a direction which is in alinement with the row of stitches and thus my stitches are more tautly held than that type shown in Figure 44.

In the drawings and specification I have set forth a preferred embodiment of my invention, and although specific terms are employed, they are used in a generic and descriptive sense only, and not for purposes of limitation, the scope of the invention being set forth in the appended claims:

I claim:

1. In a machine of the class described, a reciprocating needle adapted to pierce a fabric and means for guiding a strand to the said needle, a combined looper and cutter adapted to pass into the loop and to hold the loop to form the same, and means for holding both sides of the loop while the same is being formed and cut by the looper knife.

2. In a loop forming machine, means for passing a strand thru a fabric, means for gripping the strand after it has passed thru the fabric, and means adapted to be adjusted to hold the strand while a loop is being formed, said looping means being capable of adjustment to cause it to cut the loop after holding the same during its formative period.

3. In a looping and loop cutting machine, a reciprocating needle, means for guiding a strand of yarn to the said needle, said needle being adapted to pass the strand thru the fabric to a point below the fabric, means for gripping both sides of the loop, and a combined looping and cutting member adapted to hold the loop while the same is being formed and to cut the same after its formation.

4. In a machine for making pile fabrics, a plurality of reciprocating needles, means for guiding strands of yarn to the said needles, a fabric support, a combined looping and cutting knife for each needle adapted to enter the loop to form the same, and means for adjusting the looper to also cut the loops to form piles.

5. In a machine for forming loops, piles and the like on a fabric, a reciprocating needle bar having a needle therein, means for guiding a strand to the needle, a fabric support mounted adjacent the needle, looping means adapted to pass between the needle and the strand carried thereby to hold the strand while the needle is making its upward movement, a plurality of gripping means on the same side of the fabric support adapted to successively grip the two portions of the formed loop and to hold the same after the said loop has been formed.

6. In a machine for tufting fabrics, a reciprocating needle and means for guiding a strand to the said needle, a fabric support adapted to support a fabric, means for forming loops on the lower side of the fabric and means below the fabric support for simultaneously gripping both sides of the loop being formed.

7. In a machine of the class described, a reciprocating needle and means for guiding a strand thereto, means for supporting a fabric while the same is pierced by the needle, means for forming loops on the lower side of the fabric, means for forming loops on the upper side of the fabric at the same operation at which loops are formed on the lower side of the fabric, and means for adjusting the length of either or both the upper and lower loops.

8. In a machine of the class specified, the combination with a reciprocating needle, means for guiding a strand thereto, loop forming mechanism comprising a set of two grippers adapted to successively grip the strand on the same side of the fabric and a loop cutter adapted to cut the strand while gripped.

9. In a machine of the class specified, the combination of a reciprocating needle means for guiding a strand to the needle, means for supporting a fabric, and loop forming means, said loop forming means comprising a pair of grippers and a reciprocating knife adapted to pass between and contiguous the grippers and into the loop.

10. In a machine of the class specified, a plurality of reciprocating needles, and means for guiding a strand to each of the needles, means for supporting a fabric, means for forming spaced lines of loops on one side of the fabric, the said fabric support having a channel disposed in alignment with the row of stitches for each of the needles, and additional channels disposed between the needles adapted to permit uninterrupted passage without mashing of the rows of loops formed by passing the fabric thru the machine one time, when the fabric is passed thru the machine the second time for forming rows of loops, piles and the like.

11. In a machine of the class specified, a reciprocating needle and means for guiding a strand to the needle, a fabric support, and loop forming and loop cutting means for the needle, said loop forming and loop cutting means comprising two successively operated grippers for successively holding the two portions of the loop, a combined loop forming and loop cutting knife mounted for sliding movement between the grippers, said knife being capable of adjustment to one path of travel to engage the loops and cooperate with the grippers to form the said loops, and said knife being capable of being adjusted to another path of travel to cut the loops after forming the same.

12. In a machine of the kind specified, a plurality of reciprocating needle bars, a needle mounted in each of the needle bars, a projecting portion mounted on each one of the needle bars, grooves in which the said projections are adapted to slide, the member bearing the grooves being adapted to be reciprocated, notches in the side of said grooves, and means for forcing the projections on the needle bars into and out of the said notches at the will of the operator to render the needle bars operative and inoperative.

13. In a machine of the class described, a plurality of reciprocating needle bars mounted in a suitable framework, a needle in the lower end of each needle bar, a reciprocating member mounted in said framework, a plurality of members secured on the vertically reciprocating member and being spaced apart from each other to form guideways therebetween, a projection on each of the needle bars adapted to slide in the guideways, a notch in the edge of each of the members secured on the reciprocating member, and manually operated means adapted to engage the projections and force them into the notches to cause the needle bars to reciprocate with the reciprocating member, and manually operable means for throwing the projections out of the notches to cause the needles to assume an inoperative position.

14. In a machine of the class specified, a reciprocating needle and means for guiding a strand to the needle, an adjustable fabric support mounted below the needle, said needle being adapted to pierce a fabric supported on the fabric support, a combined looping and cutting knife, means for imparting vertical, lateral and longitudinal movement to the said looping and cutting knife to aid in the formation of loops, and means for increasing the longitudinal movement of said looping and cutting knife to cause the same to sever the loops after the formation of the same.

15. In a machine of the class specified, means for supporting a fabric, a reciprocating needle adapted to pierce the fabric and means for guiding a strand to the needle, loop forming means adapted to cooperate with the needle to form loops, the loop forming means being capable of adjustment to cause the same to cut the loops after the same have been formed, and means for regulating the length of the loops.

16. In a sewing machine, means including a plurality of needles for forming loops on both the lower and upper sides of the fabric at the same operation, means for optionally cutting the loops on at least one surface of the fabric, and means for rendering operative or inoperative any number of the needles while the machine is in motion.

17. In a machine of the class specified, the combination with a reciprocating needle and means for guiding a strand thereto, a support for a fabric while the same is being pierced by the needle, loop forming mechanism located adjacent the fabric support, said loop forming mechanism comprising an abutment provided with an inclined portion adapted to guide the needle and a gripper adapted to press against the abutment to hold the strand.

18. In a sewing machine having a reciprocating needle and means for guiding a strand thereto, a fabric support, an abutment below the fabric support and being disposed slightly out of the path of the needle, a set of two grippers associated with said abutment and needle, one of said grippers being adapted to engage the strand during downward movement of the needle to prevent the needle movement from affecting previously formed loops, the other gripper being adapted to engage both sections of the loop after the needle has passed upwardly.

19. A tufting machine comprising a work support, feeding means for the work, more than two adjacent needles having their eyes arranged in the general direction of work travel, a plurality of loopers there being one for each needle, means for actuating each looper to cooperate with its needle at an angle less than 90 degrees with respect to the work travel and form a loop, and means for actuating each needle in timed relation to its looper.

20. A tufting machine comprising a work support, a needle, means for inserting the needle through and withdrawing it from the work to form a loop, and means for supplying thread to the needle which last mentioned means includes a stationary thread tension means, a movable thread holder for pulling the thread from said tension means and means for adjusting the maximum separation between said holder and tension means to control the length of the loop formed on the side of the work adjacent the needle actuating means.

21. A tufting machine comprising a work support, means for feeding the work, a needle, means for inserting the needle through and withdrawing it from the work, means for forming loops on each side of the work at the same operation and means for regulating the length of the loop on either side of the work without changing the length of loop on the opposite side.

22. A tufting machine comprising a work support, a needle, means for inserting the needle through and withdrawing it from the work, means for forming loops on at least one side of the work and means above the work support for adjusting the length of said loops during operation of the machine.

23. A tufting machine comprising a work support, a needle, means for inserting the needle through and withdrawing it from the work, means for forming tufts on both sides of the work at the same operation and means for feeding the work through the machine without mashing the tufts on either side, said tuft forming means on the side of the work opposite the needle actuating means including a looper, and the tuft forming means on the same side of the work as the needle including means for forming loops without the interposition of any holding means within the loop while being formed.

24. A tufting machine comprising a work support, a needle, means for moving the needle through and withdrawing it from the work and for forming a loop on the side of the work contiguous to the support and means for feeding the work, said work support being provided with a tuft receiving groove open at both ends and deep enough to prevent mashing the tufts whereby the work is supported off the tufts during its movement through the machine.

25. A tufting machine comprising a work support, means for feeding the work through the machine, a plurality of needles, means for moving the needles through and withdrawing them from the work and forming tufts on the underside of the work, said work support comprising grooves for receiving all the tufts formed and open at their opposite ends and deep enough for the work being supported between the grooves and off the tufts as it passes through said machine to avoid mashing the tufts.

26. A tufting machine comprising a work support, a needle, means for inserting the needle through and withdrawing it from the work, a looper, means for actuating said looper to cooperate with the needle and form a loop, said actuating means giving the looper an up-and-down motion as well as a motion substantially longitudinal of the looper, and means for substantially eliminating the up-and-down motion from the looper while retaining its longitudinal motion.

27. A tufting machine comprising a work support, a needle, means for inserting the needle through and withdrawing it from the work, means for forming loops on both sides of the work, and means for simultaneously adjusting the length of the loops formed on both sides of the work during operation of the machine.

28. A tufting machine comprising a plurality of needles, actuating mechanism therefor, a work support, strand gripping means mounted between said needles and aligned for movement in planes forming an acute angle with the plane of the needles.

29. A tufting machine comprising a plurality of needles, actuating mechanism therefor, a work support, work feeding means and parallel loopers, there being one looper for each needle, the loopers being set at an acute angle to the line of needles, and also at an acute angle to the travel of the work through the machine.

30. A tufting machine provided with means for forming loops on opposite sides of the work at one operation, said means including a looper on at least one side, and a mechanism for forming loops on the opposite side of the work from said looper, said mechanism comprising means in addition to said looper, needle, and work, for cooperation with the strand to adjust the loop length on the side of the work opposite the looper.

31. A tufting machine provided with means for forming loops on opposite sides of the work at one operation, said means including a mechanism for adjusting the loop length on each side of the work, and means inter-connecting said loop length adjusting mechanism on each side of the work.

32. A tufting machine comprising a plurality of needles arranged in a line substantially normal to the work travel with their eyes in the general direction of work travel, means for actuating said needles, a work support, a plurality of loopers, there being one for each needle and each looper having a motion at an angle to the direction of work travel and having a motion at a smaller angle to the plane of needles.

33. A tufting machine comprising a work support, means for simultaneously forming loops on both sides of the work, and means adjustable for cutting or not cutting at least some of said loops during operation of the machine.

34. A tufting machine comprising a needle, actuating mechanism therefor, a work support, a pair of strand grippers, and means for moving said pair of grippers in a direction to assist in moving the work through the machine.

35. A tufting machine comprising a needle, actuating mechanism therefor, a work support, means for forming loops, including a combined looper and cutter, means for moving the combined looper and cutter into cooperation with the needle for forming and cutting a loop, and then withdrawing the combined looper and cutter in a different path from its movement through the loop, and without passing through the cut loop.

36. A tufting machine comprising more than two needles, actuating mechanism therefor, loop forming means for each needle, the needle-actuating mechanism comprising means for selectively rendering any needle and any number of needles operative or inoperative, said selective means being operable from a position adjacent the work support, whereby one finger of the operator's hand may hold the work, and another finger of the same hand control said selective means.

37. A tufting machine comprising a needle, actuating mechanism therefor, a work support, a combined looper and cutter, means for imparting a reciprocating motion to the combined looper and cutter longitudinally of its blade, means for imparting a reciprocating motion to said combined looper and cutter normal to the first-mentioned motion and toward and away from the work support, and means for imparting a forward and backward motion to said combined looper and cutter which is substantially normal to said first and second mentioned motions.

38. A tufting machine comprising a needle, actuating mechanism therefor, a work support, means for forming loops, means for cutting the formed loops, and a single gripping member shaped to engage simultaneously both sides of a loop being formed.

39. A tufting machine comprising a needle, actuating mechanism therefor, a work support, means for forming loops, said work support being provided with a plurality of closely adjacent tuft-receiving slots open at both ends and deep enough to allow support of the goods on said work support between the rows of tufts and without mashing said tufts.

40. A tufting machine comprising a plurality of needles, actuating mechanism therefor, a work support provided with a slot beneath each needle open at both ends and deep enough to prevent mashing the formed loops, said work support also being provided with additional slots of substantially the same size as the first-mentioned slots and located intermediate said first-mentioned slots.

41. A tufting machine comprising a plurality of needles, actuating mechanism therefor, a work support, means for feeding work through the machine, a separate looper in co-operation with each needle, and a gripper for the strand of each needle, said gripper being located on the same side of the work as the looper, and the eyes of said needles being in the general direction of travel of the work through the machine.

42. A tufting machine comprising a plurality of aligned needles, actuating mechanism therefor, a work support, means for feeding the work through the machine, a looper for each needle, and a support common to all said loopers to which each is secured, said looper support extending substantially parallel to the line of needles and each looper extending at a small acute angle between said looper support and line of needles.

43. A tufting machine comprising a plurality of aligned needles, actuating mechanism therefor, a work support, means for feeding the work through the machine, a looper for each needle, and a support common to all said loopers to which each is fixedly secured, said looper support extending substantially parallel to the line of needles, the eyes of said needles extending in the general direction of work travel through the machine and substantially normal to the line of needles.

44. A tufting machine comprising a needle, actuating mechanism therefor, a work support, means for feeding the work through the machine, a looper, a guide along which the looper travels in a direction longitudinally of the looper in forming a loop, and means for moving the looper and guide in the general direction of work travel.

45. A tufting machine comprising a needle, actuating mechanism therefor, a work support, means for feeding the work through the machine, tuft forming means, and mechanism for giving said work support a motion of translation toward and from the tuft forming means, said mechanism including a lever actuated wedge and guides along which the motion of said work support is directed.

46. A tufting machine comprising a work support, a needle, means for inserting the needle through and withdrawing it from the work, loop forming mechanism, means for cutting the formed loop, and means adjustable during the operation of the machine to cut or not cut the loops.

47. A tufting machine comprising a work support, a needle, means for inserting the needle through and withdrawing it from the work, a looper on the side of the work opposite the needle actuating mechanism, means for actuating the looper to cooperate with the needle and form a loop, means for cutting the loop, the end of said looper moving toward and past the needle between the strand and needle and means controlling the extent of such movement of the looper for simultaneously controlling the cutting or non-cutting of the formed loop.

48. A tufting machine comprising a work support, needles, means for inserting the needles through and withdrawing them from the work, a looper for each needle, means for actuating each looper to cooperate with its needle and form a loop, each looper being mounted on a common member located on the opposite side of the work from the needle actuating mechanism, said member on which each looper is mounted and each looper having a movement of translation in a direction at an angle to the travel of the work through the machine.

49. A tufting machine comprising a work support, a needle, means for inserting the needle through and withdrawing it from the work, a looper, means for actuating said looper to cooperate with the needle and form a loop, said looper being mounted on a member located on the opposite side of the work from the needle actuating mechanism, said member on which the looper is mounted and said looper having a movement in a direction across the travel of the work through the machine, said looper projecting from said member and forming an acute angle therewith in a plane parallel to the work support.

50. A tufting machine comprising a work support, a needle, means for inserting the needle through and withdrawing it from the work, means for feeding the work through the machine in the general direction of the needle eye, a looper extending and moving at a small acute angle to a normal to the direction of work travel.

51. A tufting machine comprising a work support, a needle, means for inserting the needle through and withdrawing it from the work, means for forming loops, means for feeding the work through the machine, a cutter extending and moving at a small acute angle to a normal to the direction of work travel.

52. A tufting machine comprising a work support, a needle, means for inserting the needle through and withdrawing it from the work, means for feeding the work through the machine in the general direction of the needle eye, a combined looper and cutter extending and moving between the needle and strand at a small acute angle to a normal to the direction of work travel.

53. A tufting machine comprising a needle, actuating mechanism therefor, a work support, means for feeding the work through the machine, a looper, a cutter for the loops, a support on which said cutter is moved away from the work support during cutting, and means controlling the travel of said cutter support toward and from the needle to cut or not cut the tufts.

54. In a tufting machine, a needle, a support therefor, a work support, means for forming loops on the side of the work support opposite the needle support, a loop cutter and means also on the side of the work support opposite the needle support for simultaneously gripping during cutting, both sides of the last formed loop.

55. A tufting machine comprising a work support, a needle, means for inserting the needle through and withdrawing it from the work, a looper, means for actuating said looper with a reciprocatory motion of translation to cooperate with the needle and form a loop and a single edged loop cutter supporting said looper with its edge in alignment therewith and spaced therefrom.

56. A tufting machine comprising a work support, a needle, means for inserting the needle through and withdrawing it from the work, a looper, a looper support, means for actuating said looper with a reciprocatory motion of translation to cooperate with the needle and form a loop, and a knife or single edge type loop cutter fixed on the looper and substantially coaxial therewith between the looper and its support, the active edge of the looper and the cutter edge being both arranged in the same substantially straight line.

57. A tufting machine comprising a work support, a needle, means for inserting the needle through and withdrawing it from the work, a looper, means on the opposite side of the work support from the needle for actuating said looper to cooperate with the needle and form a loop and means for resiliently mounting said looper.

58. A tufting machine comprising a work support, a needle, means for inserting the needle through and withdrawing it from the work, a looper, means for actuating said looper to cooperate with the needle and form a loop, means for resiliently mounting said looper, and guide means for the looper between the needle and the looper mounting.

59. A tufting machine comprising a needle, actuating mechanism therefor, a work support, loop forming mechanism, a loop cutter, guides between which the cutter moves and means for extracting lint from between said guides.

60. A tufting machine comprising a work support, a needle, means for inserting the needle through and withdrawing it from the work, said needle having a flattened portion, a flexible looper mounted to engage the flattened portion of the needle at an angle thereto and be bent aside by the needle, as the looper is moved toward said needle.

61. A tufting machine comprising a work support, a needle, means for inserting the needle through and withdrawing it from the work, a thin and flexible looper, means for actuating said looper to cooperate with the needle and form a loop, said looper being arranged to engage the needle and be bent aside thereby as the looper is moved toward the needle whereby said looper may engage the needle in substantially its lowermost position and without the previous formation of strand slack by the needle.

62. A tufting machine comprising a work support, a needle, means for inserting the needle through and withdrawing it from the work, a thin and flexible looper, means for actuating said looper to cooperate with the needle and form a loop, said looper being arranged to engage the needle and be bent aside thereby as the looper is moved toward the needle, said needle having a flattened portion which is engaged by the looper, and the looper being disposed at an angle to the flattened portion of said needle.

63. A tufting machine comprising a work support, a needle, means for inserting the needle through and withdrawing it from the work, a thin and flexible looper, means for actuating said looper to cooperate with the needle and form a loop, said looper being arranged to engage the needle and be bent aside thereby as the looper is moved toward the needle whereby said looper may engage the needle in substantially its lowermost position and without the previous formation of strand slack by the needle, and guide means between the needle and looper actuating means for limiting flexure of said looper.

64. An article of manufacture comprising a combination looper and cutter for a tufting machine, formed of an integral flat strip of metal having a dull edge looper portion and a sharpened edge in continuation thereof serving as a cutter, and means at one end portion by which the combined looper and cutter is adapted to be supported, said strip being laterally resilient for flexure by the needle in the formation of tufts.

65. An article of manufacture comprising a combination looper and cutter for a tufting machine, formed of an integral flat strip of metal having a dull edge looper portion and a sharpened edge in continuation thereof serving as a cutter, and means at one end portion by which the combined looper and cutter is adapted to be supported, said strip being laterally resilient and adapted for movement to cooperate with a needle in the formation of tufts, and lint extracting means between the cutter and the supported end portion of the strip.

66. A combined looper and cutter for a tufting machine in which the entire cutting edge is in substantial alignment with the less sharp edge of the looper around which the strand is held while forming the loop.

67. A loop cutter for a tufting machine, a needle with which said cutter cooperates, said cutter being flexible and arranged normally to engage said needle and be bent aside thereby.

68. In a tufting machine, a flexible looper, a support therefor, a needle with which said looper cooperates, a guide between the needle and the looper mounting to limit flexure of the looper.

69. A tufting machine comprising a work support, a needle, means for actuating the needle, a combination flexible looper and cutter, the needle being shaped for engagement by the flexible looper and cutter whereby said flexible looper and cutter may be bent aside by the needle.

70. A tufting machine comprising a work support, a plurality of needles arranged in alignment, means for actuating the needles, a plurality of combination loopers and cutters arranged in substantial parallelism for cooperation with the needles, and means for simultaneously moving said combined loopers and cutters laterally of their length.

71. A tufting machine having loop forming mechanism, a thin flexible loop cutter, means whereby the cutter tends to be flexed, a support for said cutter, and means between said support and the cutting edge of the cutter for guiding said cutter and limiting flexure thereof.

72. A tufting machine comprising a needle, actuating mechanism therefor, a work support, loop forming means for cooperation with the needle, a pair of grippers to hold the strand against pulling a previously formed loop, means for moving at least one gripper of said pair toward and from the other gripper of the pair and means for also moving the first mentioned gripper of said pair in a straight line in the direction of work travel.

73. A tufting machine comprising a needle, actuating mechanism therefor, a work support, loop forming means for cooperation with the needle and means for adjusting the work support during operation of the machine, to control the length of loops being formed, said last mentioned means being adjustable from above the work support.

In testimony whereof I affix my signature.

JOHN M. GLADISH.